United States Patent
Tamaoki et al.

(10) Patent No.: US 10,636,212 B2
(45) Date of Patent: Apr. 28, 2020

(54) METHOD FOR GENERATING IMAGE TO BE DISPLAYED ON HEAD TRACKING TYPE VIRTUAL REALITY HEAD MOUNTED DISPLAY AND IMAGE GENERATION DEVICE

(71) Applicant: BANDAI NAMCO ENTERTAINMENT INC., Tokyo (JP)

(72) Inventors: Jun Tamaoki, Tokyo (JP); Jun Mimoto, Fukuoka (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 0 days.

(21) Appl. No.: 15/264,248

(22) Filed: Sep. 13, 2016

(65) Prior Publication Data

US 2017/0076503 A1 Mar. 16, 2017

(30) Foreign Application Priority Data

Sep. 16, 2015 (JP) .................................. 2015-183387

(51) Int. Cl.
*G06T 19/00* (2011.01)
*G06F 3/01* (2006.01)

(52) U.S. Cl.
CPC ............ *G06T 19/006* (2013.01); *G06F 3/012* (2013.01); *G06F 3/013* (2013.01)

(58) Field of Classification Search
CPC ..... G06T 15/005; G06T 19/00; G06T 19/006; G06T 11/60; G02B 27/0101; G02B 27/017; G02B 27/01; G02B 27/0172; G09G 5/14; G09G 2340/10; G09G 2340/125; G06F 3/0481; G06F 3/012; G06F 3/013;

(Continued)

(56) References Cited

U.S. PATENT DOCUMENTS

| 8,823,741 B2 * | 9/2014 | Lee ......................... G06F 3/011 345/173 |
| 9,035,878 B1 * | 5/2015 | Wheeler ............... G06F 3/0484 345/156 |

(Continued)

FOREIGN PATENT DOCUMENTS

| JP | H05-305181 A | 11/1993 |
| JP | H07-271546 A | 10/1995 |

(Continued)

*Primary Examiner* — Chante E Harrison
(74) *Attorney, Agent, or Firm* — Oliff PLC

(57) ABSTRACT

A gaze determination area is provided to an image displayed on a VR-HMD. An object that has been displayed within the gaze determination area for a time equal to or longer than a given time is determined to be a gaze object (cup object). First-level menu display objects that respectively represent first-level menu items among menu items having a hierarchical structure that are set to the object are displayed in an array in a reference direction that is defined with respect to the gaze object. When the user has turned his/her head so that the desired first-level menu display object is displayed within the gaze determination area, and the desired first-level menu display object has been detected to be the gaze object, the first-level menu item is selected, and second-level menu display objects that are lower than the selected first-level menu item are displayed.

34 Claims, 28 Drawing Sheets

(58) Field of Classification Search
CPC .... G06F 3/04842; G06F 3/017; G06F 3/0482; H04N 5/272; H04N 1/00408
USPC ......... 345/632–63, 7–84, 629–635; 715/822; 348/143; 463/30–37
See application file for complete search history.

(56) References Cited

U.S. PATENT DOCUMENTS

| | | | |
|---|---|---|---|
| 2011/0050900 A1* | 3/2011 | Sato | G06Q 30/02 348/143 |
| 2011/0179376 A1 | 7/2011 | Berestov et al. | |
| 2012/0069050 A1* | 3/2012 | Park | G06F 3/04883 345/632 |
| 2012/0256823 A1* | 10/2012 | Lee | G06F 3/011 345/156 |
| 2013/0050258 A1* | 2/2013 | Liu | G06F 3/005 345/633 |
| 2013/0187835 A1* | 7/2013 | Vaught | G06K 9/00604 345/8 |
| 2013/0194164 A1* | 8/2013 | Sugden | G02B 27/017 345/8 |
| 2015/0007114 A1* | 1/2015 | Poulos | G06F 3/012 715/852 |
| 2015/0153571 A1* | 6/2015 | Ballard | G02B 27/017 345/8 |
| 2015/0199081 A1* | 7/2015 | Wheeler | G06F 3/0482 715/781 |
| 2015/0324645 A1* | 11/2015 | Jang | G06F 3/012 345/633 |
| 2015/0338915 A1* | 11/2015 | Publicover | G06F 21/64 345/633 |
| 2016/0011724 A1* | 1/2016 | Wheeler | G06F 3/0482 715/822 |
| 2016/0012612 A1* | 1/2016 | Koga | G06F 3/14 345/633 |
| 2016/0034039 A1* | 2/2016 | Maeda | G06F 3/011 715/810 |
| 2016/0055676 A1* | 2/2016 | Kasahara | G06T 19/006 345/633 |
| 2016/0125652 A1* | 5/2016 | McCormack | G06T 19/006 348/53 |
| 2016/0162020 A1* | 6/2016 | Lehman | G06F 3/013 715/835 |
| 2016/0357252 A1* | 12/2016 | Gavriliuc | H04N 13/0484 |
| 2017/0052373 A1* | 2/2017 | Memmott | G02B 27/0172 |
| 2017/0109936 A1* | 4/2017 | Powderly | G06F 3/012 |
| 2017/0131764 A1* | 5/2017 | Bognar | G06T 7/50 |
| 2017/0206691 A1* | 7/2017 | Harrises | G06T 11/60 |
| 2019/0362557 A1* | 11/2019 | Lacey | G06F 3/167 |

FOREIGN PATENT DOCUMENTS

| | | |
|---|---|---|
| JP | 2000-210468 A | 8/2000 |
| JP | 2000-250677 A | 9/2000 |
| JP | 2003-125313 A | 4/2003 |
| JP | 2010-128097 A | 6/2010 |

\* cited by examiner

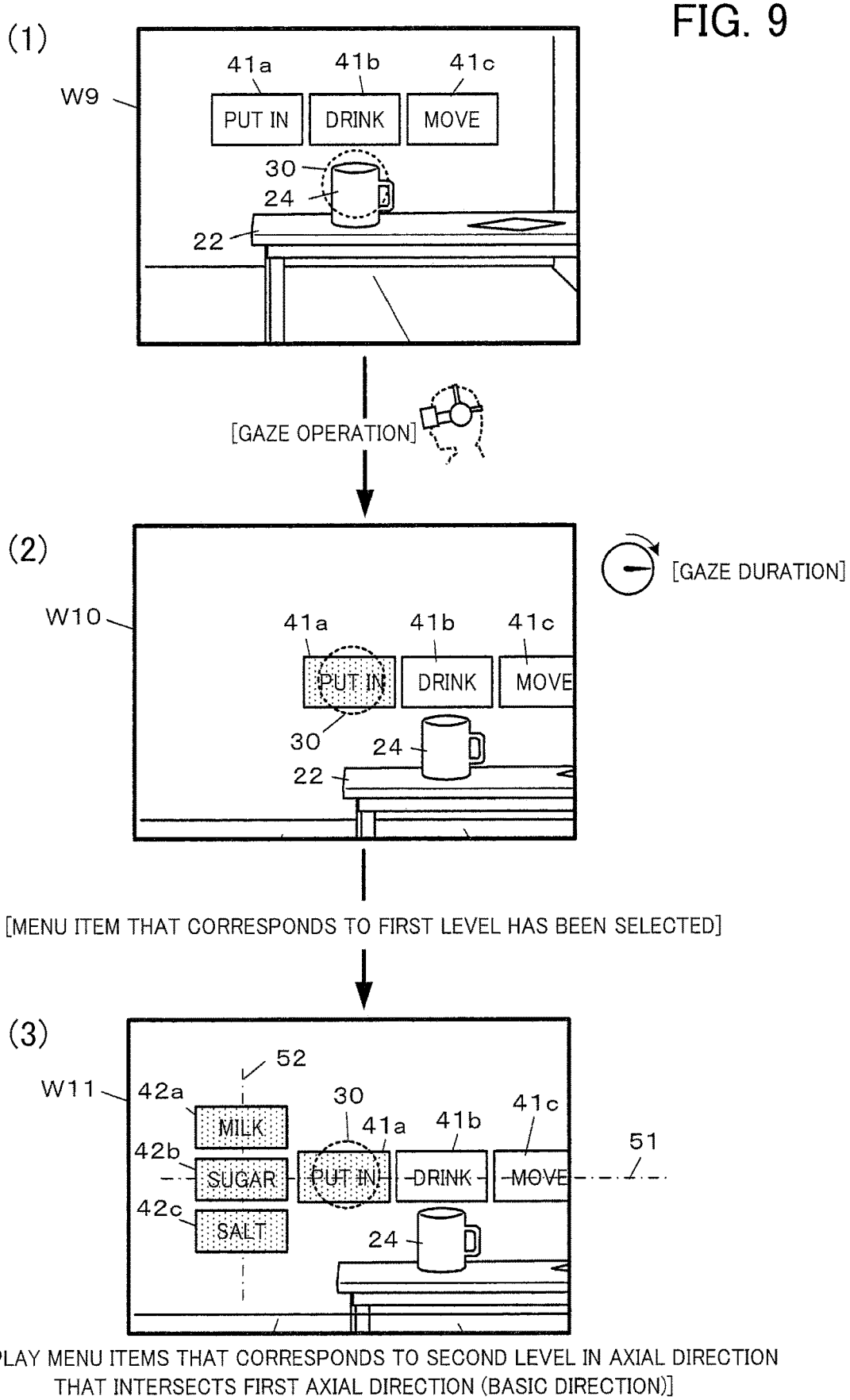

METHOD FOR GENERATING IMAGE TO BE DISPLAYED ON HEAD TRACKING TYPE VIRTUAL REALITY HEAD MOUNTED DISPLAY AND IMAGE GENERATION DEVICE

Japanese Patent Application No. 2015-183387 filed on Sep. 16, 2015, is hereby incorporated by reference in its entirety.

BACKGROUND

Technology that implements an attraction or a game using a head mounted display (HMD) is disclosed in JP-A-5-305181, JP-A-2000-210468, and JP-A-2003-125313, for example. The HMD has high affinity to head tracking type virtual reality technology, and has attracted attention in recent years as a key device that allows the user to experience vivid and powerful virtual reality.

A game or the like that is implemented using a head tracking type virtual reality head mounted display (VR-HMD) has a prominent feature in which the player (user) can obtain a view in the desired direction in real time by merely turning his/her head. This makes it possible to provide the player (user) with an overwhelming experience that cannot be achieved by a known method that allows the player (user) to view only an image displayed on a stationary video display.

When a virtual reality head mounted display (VR-HMD) is used, a menu presentation-display method significantly affects convenience, and also affects the attractiveness of a game.

Specific video contents (e.g., video game) require the player (user) to perform a menu selection operation a number of times. However, the player must perform a menu selection operation by manually operating a game controller that is held and operated by the player even when a head tracking type virtual reality head mounted display (VR-HMD) is used. Such a problem is not limited to the menu selection operation, but also occurs when displaying various types of information such as information about an object (e.g., status information about a player character).

SUMMARY

According to the first aspect of the invention, there is provided a method for causing a computer to generate an image (hereinafter referred to as "VR-HMD image") that is displayed on a head tracking type virtual reality head mounted display (hereinafter referred to as "VR-HMD"), the method comprising:

causing the computer to set a virtual space that is displayed within the VR-HMD image, a plurality of objects being placed in the virtual space;

causing the computer to determine a line-of-sight direction of the VR-HMD in the virtual space;

causing the computer to determine an object among the plurality of objects that is situated to intersect the line-of-sight direction to be a selected object; and causing the computer to place an information array in the virtual space, a plurality of information arrangement directions being defined in a relative and three-dimensional manner with respect to the information array, and the information array being placed in the virtual space so that a position of the selected object serves as a base point, and the information arrangement direction has a given relative relationship with respect to the line-of-sight direction.

According to the second aspect of the invention, there is provided a method for causing a computer to generate an image (hereinafter referred to as "VR-HMD image") that is displayed on a head tracking type virtual reality head mounted display (hereinafter referred to as "VR-HMD"), the method comprising:

causing the computer to set a virtual space that is displayed within the VR-HMD image, a plurality of objects being placed in the virtual space;

causing the computer to determine a line-of-sight direction of the VR-HMD in the virtual space;

causing the computer to place an information array in the virtual space, a plurality of information arrangement directions being defined in a relative and three-dimensional manner with respect to the information array, and the information array being placed in the virtual space so as to satisfy a given placement condition; and causing the computer to change a size of the information array so that the information array is situated within a given effective field of view with respect to the line-of-sight direction when the size of the information array exceeds the given effective field of view.

According to the third aspect of the invention, there is provided a method for causing a computer to generate an image (hereinafter referred to as "VR-HMD image") that is displayed on a head tracking type virtual reality head mounted display (hereinafter referred to as "VR-HMD"), the method comprising:

causing the computer to set a virtual space that is displayed within the VR-HMD image, a plurality of objects being placed in the virtual space;

causing the computer to determine a line-of-sight direction of the VR-HMD in the virtual space;

causing the computer to recognize a voice input through a microphone;

causing the computer to determine an object among the plurality of objects to be a selected object based on a result of the recognition; and causing the computer to place an information array in the virtual space, a plurality of information arrangement directions being defined in a relative and three-dimensional manner with respect to the information array, and the information array being placed in the virtual space so that a position of the selected object serves as a base point, and the information arrangement direction has a given relative relationship with respect to the line-of-sight direction.

BRIEF DESCRIPTION OF THE DRAWINGS

FIG. 9 is a view illustrating a menu display object selection method (i.e., menu item selection method).

DESCRIPTION OF EXEMPLARY EMBODIMENTS

Figure 1:
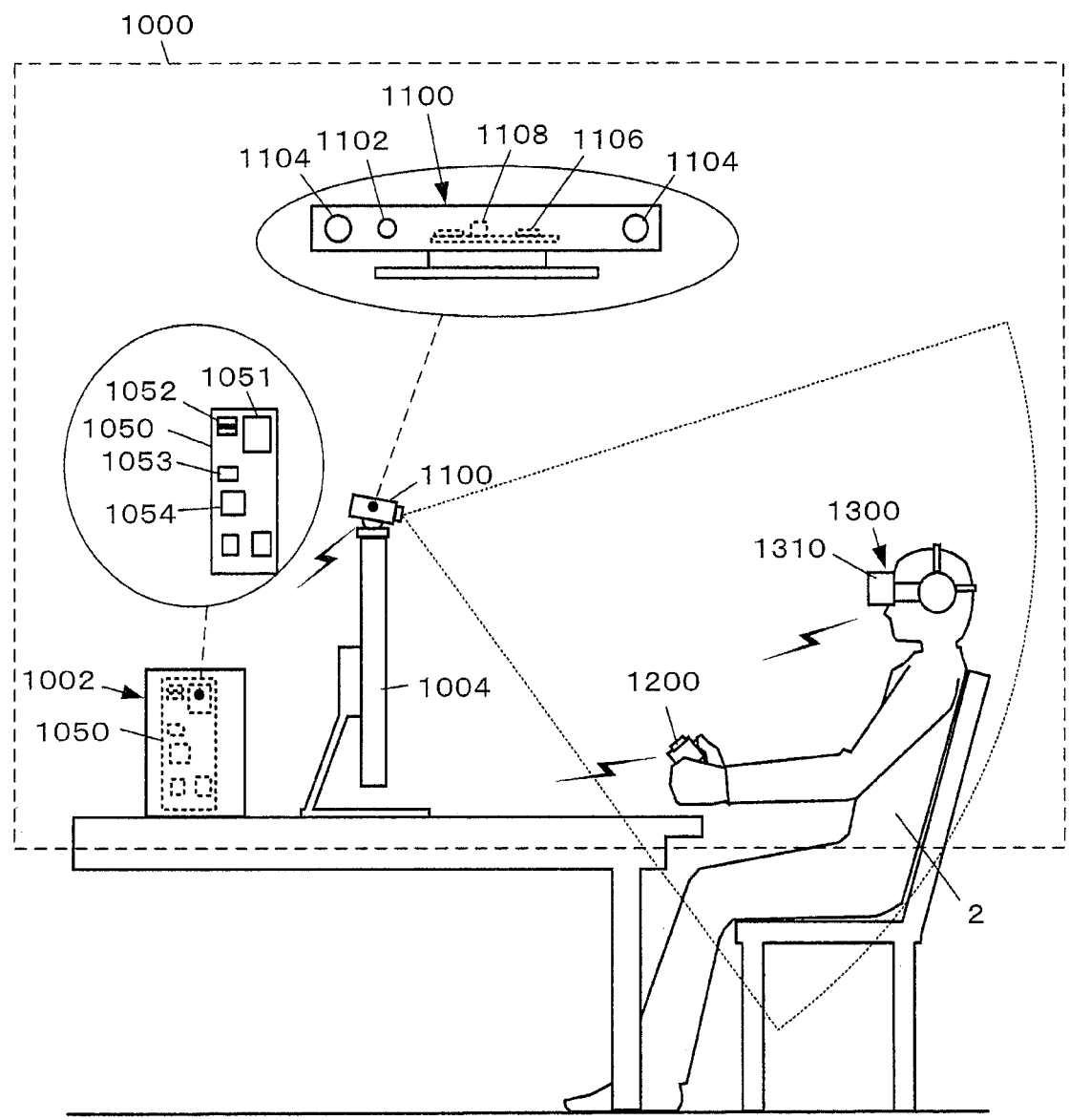
FIG. 1 is a view illustrating an example of the configuration of a game device (image generation device).

Several exemplary embodiments of the invention may provide novel information display technology that is used when providing video contents (e.g., game) using a head tracking type VR-HMD. Several exemplary embodiments of the invention may provide novel information display operation technology that does not require manual operation, and provide an improved video experience through the addition of a near-futuristic operation feel to the overwhelming virtual reality implemented by the VR-HMD.

According to one embodiment of the invention, there is provided a method for causing a computer to generate an image (hereinafter referred to as "VR-HMD image") that is displayed on a head tracking type virtual reality head mounted display (hereinafter referred to as "VR-HMD"), the method comprising:

causing the computer to set a virtual space that is displayed within the VR-HMD image, a plurality of objects being placed in the virtual space;

causing the computer to determine a line-of-sight direction of the VR-HMD in the virtual space;

causing the computer to determine an object among the plurality of objects that is situated to intersect the line-of-sight direction to be a selected object; and causing the computer to place an information array in the virtual space, a plurality of information arrangement directions being defined in a relative and three-dimensional manner with respect to the information array, and the information array being placed in the virtual space so that a position of the selected object serves as a base point, and the information arrangement direction has a given relative relationship with respect to the line-of-sight direction.

According to another embodiment of the invention, there is provided an image generation device that generates an image (hereinafter referred to as "VR-HMD image") that is displayed on a head tracking type virtual reality head mounted display (hereinafter referred to as "VR-HMD"), the image generation device comprising:

a virtual space setting section that sets a virtual space that is displayed within the VR-HMD image, a plurality of objects being placed in the virtual space;

a line-of-sight direction determination section that determines a line-of-sight direction of the VR-HMD in the virtual space;

a selected object determination section that detects an object among the plurality of objects that has been situated to intersect the line-of-sight direction, and determines the detected object to be a selected object based on a result of the detection; and an information array control section that places an information array in the virtual space, a plurality of information arrangement directions being defined in a relative and three-dimensional manner with respect to the information array, and the information array being placed in the virtual space so that a position of the selected object serves as a base point, and the information arrangement direction has a given relative relationship with respect to the line-of-sight direction.

According to the above configuration, when the line-of-sight direction of the VR-HMD in the virtual space has been changed to intersect the desired object, the desired object is determined to be the selected object. The information about the selected object is placed in the virtual space in the form of an information array so that the position of the selected object serves as a base point, and the information arrangement direction has a given relative relationship with respect to the line-of-sight direction.

Specifically, it is possible to display information in a novel way without requiring manual operation when providing video contents (e.g., game) using a head tracking type VR-HMD.

Since the information about the object that is situated to intersect the line of sight is displayed in the virtual space so as to surround the object, it is possible to provide an improved video experience through the addition of a near-futuristic operation feel to the overwhelming virtual reality implemented by the VR-HMD.

The method may further comprise:

causing the computer to change a size of the information array corresponding to a distance from a viewpoint position of the VR-HMD to the selected object in the virtual space.

According to this configuration, it is possible to appropriately adjust the extension of the information array within the field of view by changing the size of the information array.

The method may further comprise:

causing the computer to change the size of the information array so that the information array is situated within a range defined by a given angle that falls within a horizontal angle of view of 60 to 80° with respect to the line-of-sight direction when the size of the information array in a rightward-leftward direction exceeds the range defined by the given angle.

A horizontal angle of view of 60 to 80° corresponds to the field of view of a human obtained without turning his/her head.

According to this configuration, it is possible to place the information array within a range in which the information array can be observed without moving the eyeballs in the rightward-leftward direction.

The method may further comprise:

causing the computer to measure a selection duration in which an identical object is selected, and determine whether or not to place and display the information array.

According to this configuration, it is possible to determine the selected object based on the line-of-sight direction of the VR-HMD in the virtual space, and the duration in which the object has been viewed. Therefore, it is possible to prevent a situation in which the selected object is accidentally determined when the line of sight is moved, and the information array is displayed.

According to another embodiment of the invention, there is provided a method for causing a computer to generate an image (hereinafter referred to as "VR-HMD image") that is displayed on a head tracking type virtual reality head mounted display (hereinafter referred to as "VR-HMD"), the method comprising:

causing the computer to set a virtual space that is displayed within the VR-HMD image, a plurality of objects being placed in the virtual space;

causing the computer to determine a line-of-sight direction of the VR-HMD in the virtual space;

causing the computer to place an information array in the virtual space, a plurality of information arrangement directions being defined in a relative and three-dimensional manner with respect to the information array, and the information array being placed in the virtual space so as to satisfy a given placement condition; and causing the computer to change a size of the information array so that the information array is situated within a given effective field of view with respect to the line-of-sight direction when the size of the information array exceeds the given effective field of view.

According to another embodiment of the invention, there is provided an image generation device that generates an image (hereinafter referred to as "VR-HMD image") that is displayed on a head tracking type virtual reality head mounted display (hereinafter referred to as "VR-HMD"), the image generation device comprising:

a virtual space setting section that sets a virtual space that is displayed within the VR-HMD image, a plurality of objects being placed in the virtual space;

a line-of-sight direction determination section that determines a line-of-sight direction of the VR-HMD in the virtual space; and an information array control section that places an information array in the virtual space so as to satisfy a given placement condition, a plurality of information arrangement directions being defined in a relative and three-dimensional manner with respect to the information array, and changes a size of the information array so that the information array is situated within a given effective field of view with respect to the line-of-sight direction when the size of the information array exceeds the given effective field of view.

The effective field of view corresponds to the field of view of a human obtained without turning his/her head.

According to this configuration, it is possible to place the information array within a range in which the information array can be observed without moving the eyeballs in the rightward-leftward direction.

The method may further comprise:

causing the computer to determine an object among the plurality of objects to be a selected object; and causing the computer to place the information array in the virtual space so that a position of the selected object serves as a base point, and the information arrangement direction has a given relative relationship with respect to the line-of-sight direction.

According to this configuration, it is possible to change the placement of the information array by determining the selected object so that the position of the selected object serves as a base point, and the information arrangement direction has a given relative relationship with respect to the line-of-sight direction.

According to another embodiment of the invention, there is provided a method for causing a computer to generate an image (hereinafter referred to as "VR-HMD image") that is displayed on a head tracking type virtual reality head mounted display (hereinafter referred to as "VR-HMD"), the method comprising:

causing the computer to set a virtual space that is displayed within the VR-HMD image, a plurality of objects being placed in the virtual space;

causing the computer to determine a line-of-sight direction of the VR-HMD in the virtual space;

causing the computer to recognize a voice input through a microphone;

causing the computer to determine an object among the plurality of objects to be a selected object based on a result of the recognition; and causing the computer to place an information array in the virtual space, a plurality of information arrangement directions being defined in a relative and three-dimensional manner with respect to the information array, and the information array being placed in the virtual space so that a position of the selected object serves as a base point, and the information arrangement direction has a given relative relationship with respect to the line-of-sight direction.

According to another embodiment of the invention, there is provided an image generation device that generates an image (hereinafter referred to as "VR-HMD image") that is displayed on a head tracking type virtual reality head mounted display (hereinafter referred to as "VR-HMD"), the image generation device comprising:

a virtual space setting section that sets a virtual space that is displayed within the VR-HMD image, a plurality of objects being placed in the virtual space;

a line-of-sight direction determination section that determines a line-of-sight direction of the VR-HMD in the virtual space;

a voice recognition section that recognizes a voice input through a microphone;

a selected object determination section that determines an object among the plurality of objects to be a selected object based on a result of the recognition performed by the voice recognition section; and an information array control section that places an information array in the virtual space, a plurality of information arrangement directions being defined in a relative and three-dimensional manner with respect to the information array, and the information array being placed in the virtual space so that a position of the selected object serves as a base point, and the information arrangement direction has a given relative relationship with respect to the line-of-sight direction.

According to this configuration, it is possible to implement novel information display technology that displays the information array in the field-of-view direction using the object selected by voice recognition as a base point.

The method may comprise, wherein a reference direction with respect to the information array is linked to the object, and the information array has a hierarchical structure in which the information arrangement direction is defined on a level basis, the method further comprising:

causing the computer to place the information array so that the information arrangement direction that corresponds to a first level coincides with the reference direction that is linked to the selected object.

According to this configuration, it is possible to set the information arrangement direction on a level basis, and display the information array so that the information arrangement direction that corresponds to the first level extends along the reference direction of the selected object.

The method may comprise, wherein the information array is an array of items having a hierarchical structure, and has a configuration in which the information arrangement direction is defined on a level basis, the method may further comprising:

causing the computer to select an item from the items displayed as the information array in a hierarchical order; and causing the computer to arrange corresponding items in a corresponding information arrangement direction in a hierarchical order based on the selected item.

According to this configuration, it is possible to set the information arrangement direction on a level basis. When the user has selected an item from the items that correspond to one level and are displayed in the form of an information array, the items that correspond to the next (lower) level are displayed in the form of an information array in a direction that differs from the information arrangement direction of the items that correspond to the one level so as to be selectable. Therefore, it is possible to employ a selection method that is friendly to the user who observes the VR-HMD image in terms of visibility.

The method may further comprise:

causing the computer to arrange items that correspond to a higher level and items that correspond to a lower level with respect to the level of the selected item in directions that intersect each other.

According to this configuration, since the items that correspond to the higher level and the items that correspond to the lower level with respect to the level of the selected item can be placed (displayed) in directions that intersect each other, it is possible to implement a hierarchical display that can be easily observed three-dimensionally.

The method may further comprise:

causing the computer to detect a head shake of a user from a motion of the VR-HMD; and causing the computer to delete display of the information array when the head shake has been detected.

According to this configuration, the player can cancel and delete the display of the information array by shaking his/her head.

The exemplary embodiments of the invention are described below taking an example of a game device that implements a virtual reality type video game using a head tracking type virtual reality head mounted display (VR-HMD).

FIG. 1 is a view illustrating an example of the configuration of a game device according to one embodiment of the invention.

A game device 1000 illustrated in FIG. 1 is an image generation device to which the invention is applied. The game device 1000 includes a game device main body 1002, a touch panel 1004, a range sensor unit 1100, a game controller 1200, and a headset 1300 that is provided with a VR-HMD 1310. An example in which the VR-HMD 1310 is a non-see-through (immersive) HMD is described below. Note that the VR-HMD 1310 may be a semi-see-through or see-through HMD.

The game device main body 1002 is one type of computer, and includes a control board 1050.

The control board 1050 includes 1) a microprocessor (e.g., central processing unit (CPU) 1051, graphics processing unit (GPU), and digital signal processor (DSP)), 2) an IC memory 1052 (e.g., VRAM, RAM, and ROM), 3) a communication module 1053 that communicates with a peripheral device (e.g., touch panel 1004, range sensor unit 1100, game controller 1200, and headset 1300) through wireless communication or cable communication, and 4) a driver circuit 1054 (e.g., a driver circuit that drives the touch panel 1004), for example.

Note that part or the entirety of the control board 1050 may be implemented by an application-specific integrated circuit (ASIC), a field-programmable gate array (FPGA), or a system-on-a-chip (SoC).

The game device main body 1002 reads a program and data stored in the IC memory 1052 using the control board 1050, and performs a calculation process to control the game device 1000 (i.e., cause the game device 1000 to execute the video game).

The touch panel 1004 is a video monitor that includes a touch panel, and is placed approximately in front of a player 2.

The range sensor unit 1100 is secured on the upper part of the touch panel 1004 so that the range sensor unit 1100 faces in the front direction of the display screen of the monitor, and the headset 1300 and the game controller 1200 are included within the capture range, for example. The range sensor unit 1100 captures an image of the player 2 positioned in front of the touch panel 1004, and an object situated around the player 2, and outputs the resulting image data to the game device main body 1002. The range sensor unit 1100 analyzes the captured image to calculate the distance to the player 2 and the object situated around the player 2, and outputs distance information to the game device main body 1002. Note that a front view of the range sensor unit 1100 is also illustrated in FIG. 1.

The range sensor unit 1100 includes an infrared irradiator 1102 that emits infrared rays (IR) forward, a color image sensor 1104 that can capture an image (reflected infrared image) of the reflected infrared rays from the object situated in front of the range sensor unit 1100, and one or a plurality of LSI 1106 that analyze the reflected infrared image to calculate the relative distance to the object, and perform an image recognition process, for example. The color image sensor 1104 is one type of imaging means.

The range sensor unit 1100 recognizes the game controller 1200, the headset 1300, and each part of the body of the player 2 from the image captured by the color image sensor 1104, and determines a representative point within the captured image. The range sensor unit 1100 then determines the distance to the representative point. Such a ranging process may be implemented by utilizing known IR range sensor technology.

Note that the ranging technology employed for the range sensor unit 1100 is not limited to IR ranging technology. Another ranging technology may also be appropriately used. For example, a stereo image may be captured using a right color image sensor 1104 and a left color image sensor 1104, and the distance may be calculated from the disparity.

The range sensor unit 1100 includes a known 6-axis sensor 1108.

The 6-axis sensor 1108 is a known motion trace sensor that detects movements in the longitudinal direction (i.e., the direction of the optical axis of the color image sensor 1104), the lateral direction, and the vertical direction (triaxial directions) of the range sensor unit 1100, and the rotation around each axis. For example, the 6-axis sensor 1108 detects accelerations in the triaxial directions, and angular velocities around the three axes. The 6-axis sensor 1108 may detect accelerations in the triaxial directions, and geomagnetic directions (north, south, east, and west). The orientation of the depth axis (Z-axis (i.e., axis in the depth direction)) of the coordinate system of the ranging space can be determined from the detection results of the 6-axis sensor 1108.

The range sensor unit 1100 appropriately includes a communication module for communicating with the game device main body 1002, a battery, and the like.

Figure 2A:
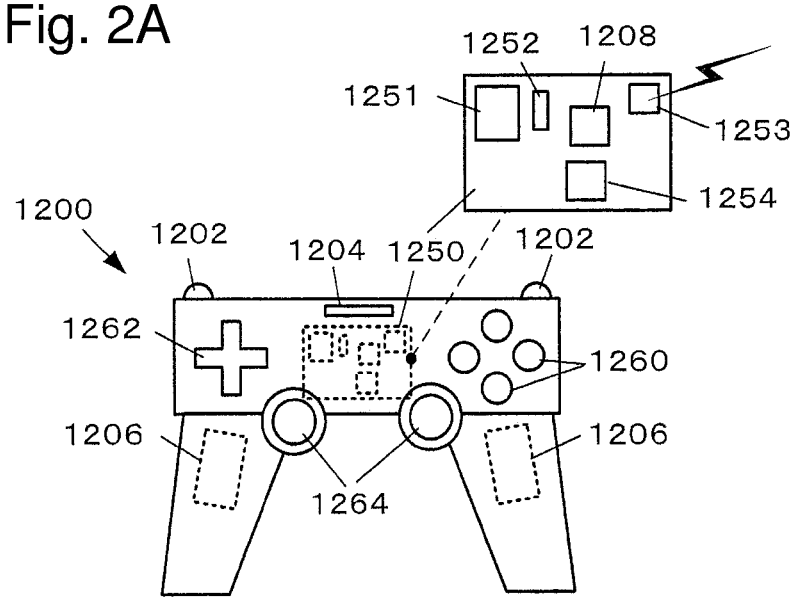
FIG. 2A is a view illustrating a configuration example of a game controller.
Figure 2B:
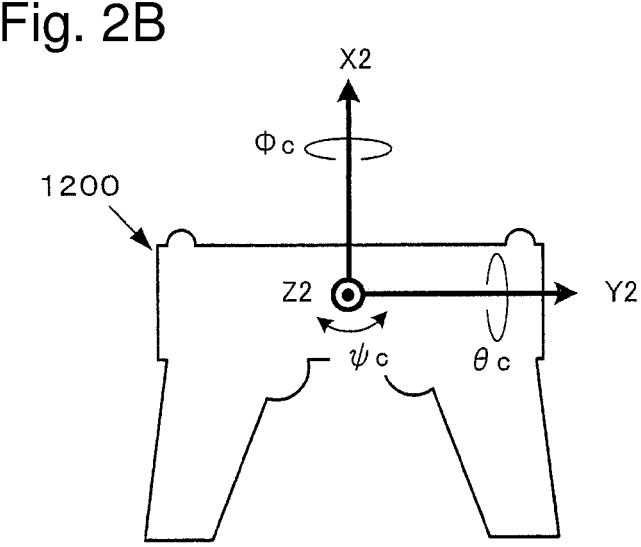
FIG. 2B is a view illustrating a coordinate system define for a game controller.

FIG. 2A is a view illustrating a configuration example of the game controller 1200, and FIG. 2B is a view illustrating a coordinate system defined for the game controller 1200.

The game controller 1200 according to one embodiment of the invention is designed so that the game controller 1200 is held with both hands during use. Note that the game controller 1200 may also be designed so that the game controller 1200 is held with one hand (e.g., gun-type controller). The game controller 1200 includes a light-emitting marker 1202, a speaker 1204, a vibrator 1206, a 6-axis sensor 1208, a controller board 1250, a battery (not illustrated in FIG. 2A), and the like.

The light-emitting marker 1202 is implemented by an LED or the like. The light-emitting marker 1202 is controlled by the controller board 1250. The light-emitting marker 1202 always emits light in a normal state.

The 6-axis sensor 1208 is a known motion trace sensor that detects movements in the longitudinal direction (X2-axis), the lateral direction (Y2-axis), and the vertical direction (Z2-axis) of the game controller 1200, and the rotation ($\Phi c$, $\theta c$, $\Psi c$) around each axis. For example, the 6-axis sensor 1208 detects accelerations in the triaxial directions, and angular velocities around the three axes. The 6-axis sensor 1208 may detect accelerations in the triaxial directions, and geomagnetic directions (north, south, east, and west).

The controller board 1250 includes a CPU 1251, an IC memory 1252, a communication module 1253, an interface circuit 1254, and the like, and controls the operation of the game controller 1200, and communication with the outside. The interface circuit 1254 controls output of a control signal to the speaker 1204 and the vibrator 1206, and controls input of a signal from an operation button switch 1260, an arrow key 1262, a joystick 1264, and the like.

Figure 3A:
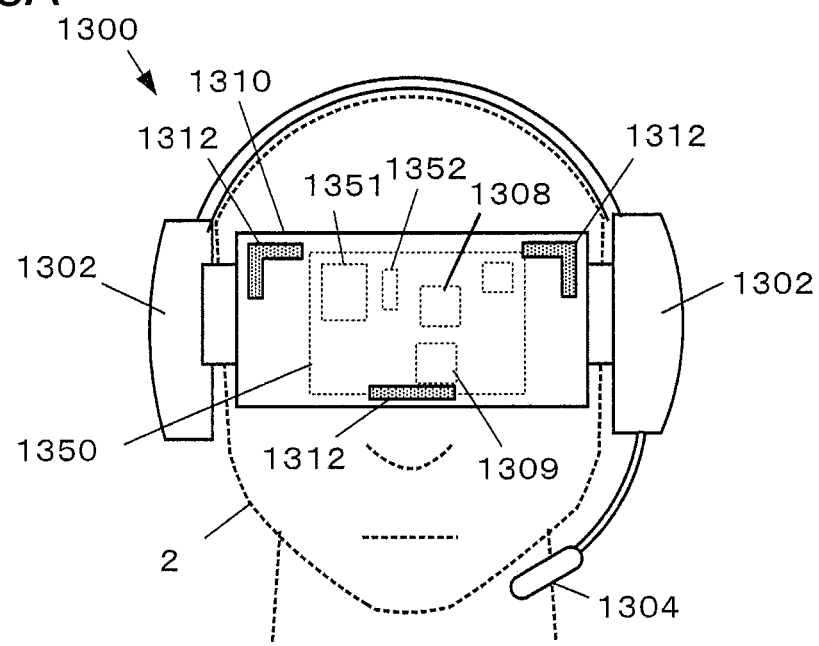
FIG. 3A is a front view illustrating a headset.
Figure 3B:
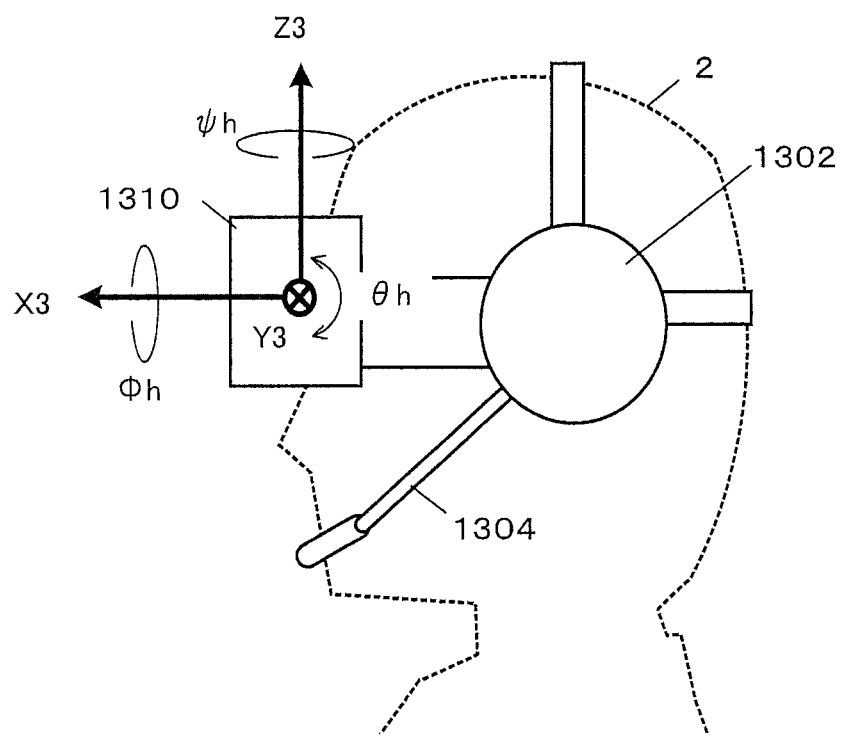
FIG. 3B is a side view illustrating a headset.

FIGS. 3A and 3B are a front view and a side view illustrating a configuration example of the headset 1300 according to one embodiment of the invention.

The headset 1300 is an accessory (electronic device) that is designed to be worn on the head of the player 2. The headset 1300 provides image information and sound information to the player 2, and has a function of detecting the position and the attitude of the head of the player 2 for implementing head tracking. For example, the headset 1300 includes a headphone 1302, a microphone 1304, the VR-HMD 1310, and a headset board 1350.

It is desirable that the headphone 1302 be a closed stereo headphone.

The VR-HMD 1310 may be implemented by a non-see-through (immersive) head mounted display that provides a viewing angle that corresponds to the viewing angle of human vision, and a driver circuit that drives the head mounted display.

For example, the VR-HMD 1310 includes a communication IC that receives an image signal from the headset board 1350, an image display device and an optical element that present an image based on the received image signal to the eyes of the wearer at a viewing angle that corresponds to the naked-eye viewing angle, a 6-axis sensor 1308, an IC chip 1309 that calculates information about the acceleration and the attitude of the head detected by the 6-axis sensor 1308, and a communication module 1352 for communicating with the game device main body 1002. Note that some of these elements may be included in the headset board 1350.

The 6-axis sensor 1308 is a known motion trace sensor that detects movements in the longitudinal direction (X3-axis), the lateral direction (Y3-axis), and the vertical direction (Z3-axis) of the VR-HMD 1310 (i.e., the head of the player 2), and the rotation ($\Phi h$, $\theta h$, $\Psi h$) around each axis. For example, the 6-axis sensor 1308 detects accelerations in the triaxial directions, and angular velocities around the three axes. The 6-axis sensor 1308 may detect accelerations in the triaxial directions, and geomagnetic directions (north, south, east, and west).

The headset board 1350 is a control board that is connected to each section of the headset 1300, and performs a calculation process required for the headset, and a data communication control process for communicating with the outside. For example, the headset board 1350 may be implemented by a CPU 1351, an IC memory, an image processing LSI, a communication IC, an interface circuit, and the like. The headset board 1350 can transmit sound data that represents sound collected by the microphone 1304, and acceleration data that represents accelerations detected by the 6-axis sensor 1308, to the game device main body 1002.

Three light-emitting markers 1312 are provided to the front side of the VR-HMD 1310. The light-emitting marker 1312 is implemented by an LED or the like. The light-emitting marker 1312 is controlled by the headset board 1350. The light-emitting marker 1312 always emits light in a normal state. The light-emitting marker 1312 is used as a marker for recognizing the presence or absence and the position of the VR-HMD 1310 from the image captured by the color image sensor 1104 included in the range sensor unit 1100.

Figure 4:
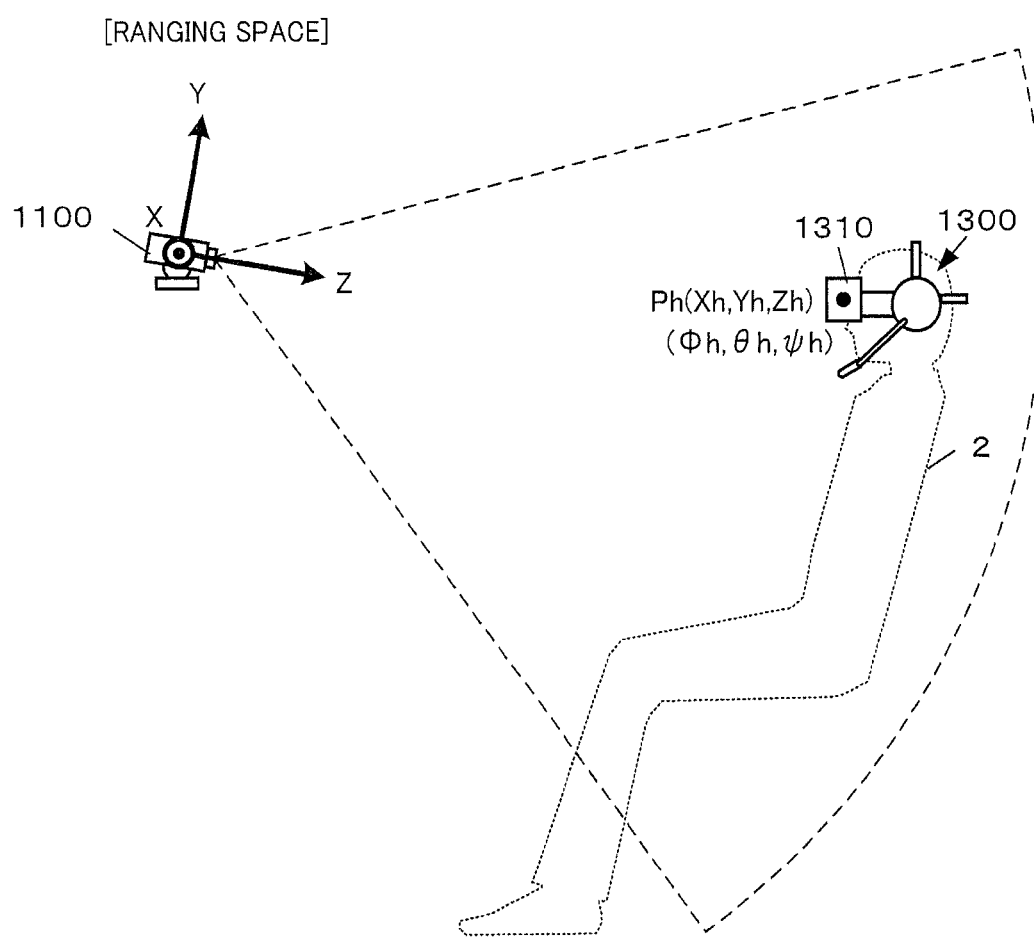
FIG. 4 is a view illustrating a coordinate system of a ranging space, and elements that are subjected to a ranging process and a recognition process.

FIG. 4 is a view illustrating the coordinate system of the ranging space, and the elements that are subjected to the ranging process and the recognition process.

The coordinate system of the ranging space is designed so that the range sensor unit 1100 corresponds to the origin, and the direction of the optical axis of the color image sensor 1104 corresponds to the depth axis (Z-axis). The scale of the ranging space is set to be the same as that of the real space. Each axial direction of the coordinate system of the ranging space is defined corresponding to the attitude of the range sensor unit 1100. The attitude of the range sensor unit 1100 is determined from the detection results of the 6-axis sensor 1108. Since the horizontal direction and the vertical direction of the real space can be calculated from the detection results of the 6-axis sensor 1109, the direction of the coordinate axis of the ranging space can be set along the horizontal direction and the vertical direction.

The game device 1000 according to one embodiment of the invention is configured so that the position Ph of the VR-HMD 1310 in the ranging space is detected and updated (e.g., in a given cycle (e.g., every 100 ms)) through the ranging process performed by the range sensor unit 1100.

More specifically, the presence of the VR-HMD 1310 is recognized by recognizing the light-emitting marker 1312 of the VR-HMD 1310 from the image captured by the color image sensor 1104 included in the range sensor unit 1100, and the position Ph of the VR-HMD 1310 is determined from the position of the light-emitting marker 1312 in the image coordinate system, and the ranging results for the position of the light-emitting marker 1312. Note that the position Ph may be calculated from the relative positional relationship, the relative distance, and the size of the light-emitting marker 1312 with respect to the range sensor unit 1100.

The attitude ($\Phi h$, $\theta h$, $\Psi h$) of the VR-HMD 1310 (i.e., the line-of-sight direction (front direction) of the player who wears the VR-HMD 1310) is detected from the size, the tilt, and the shape of each of the light-emitting markers 1312 within the image captured by the color image sensor 1104, and the size, the tilt, and the shape of a figure formed by connecting the light-emitting markers 1312. It is possible to determine the attitude of the VR-HMD 1310 and a change in the attitude of the VR-HMD 1310 at the position Ph using the 6-axis sensor 1308 included in the VR-HMD 1310.

When the 6-axis sensor 1308 and the 6-axis sensor 1208 include a terrestrial magnetism sensor or the like, and can detect the attitude with respect to the geomagnetic direction, the detected attitude can be used as correction information when calculating the attitude using the light-emitting marker 1312 and the light-emitting marker 1202, or the attitude can be calculated without using the light-emitting marker 1312 and the light-emitting marker 1202.

Figure 5:
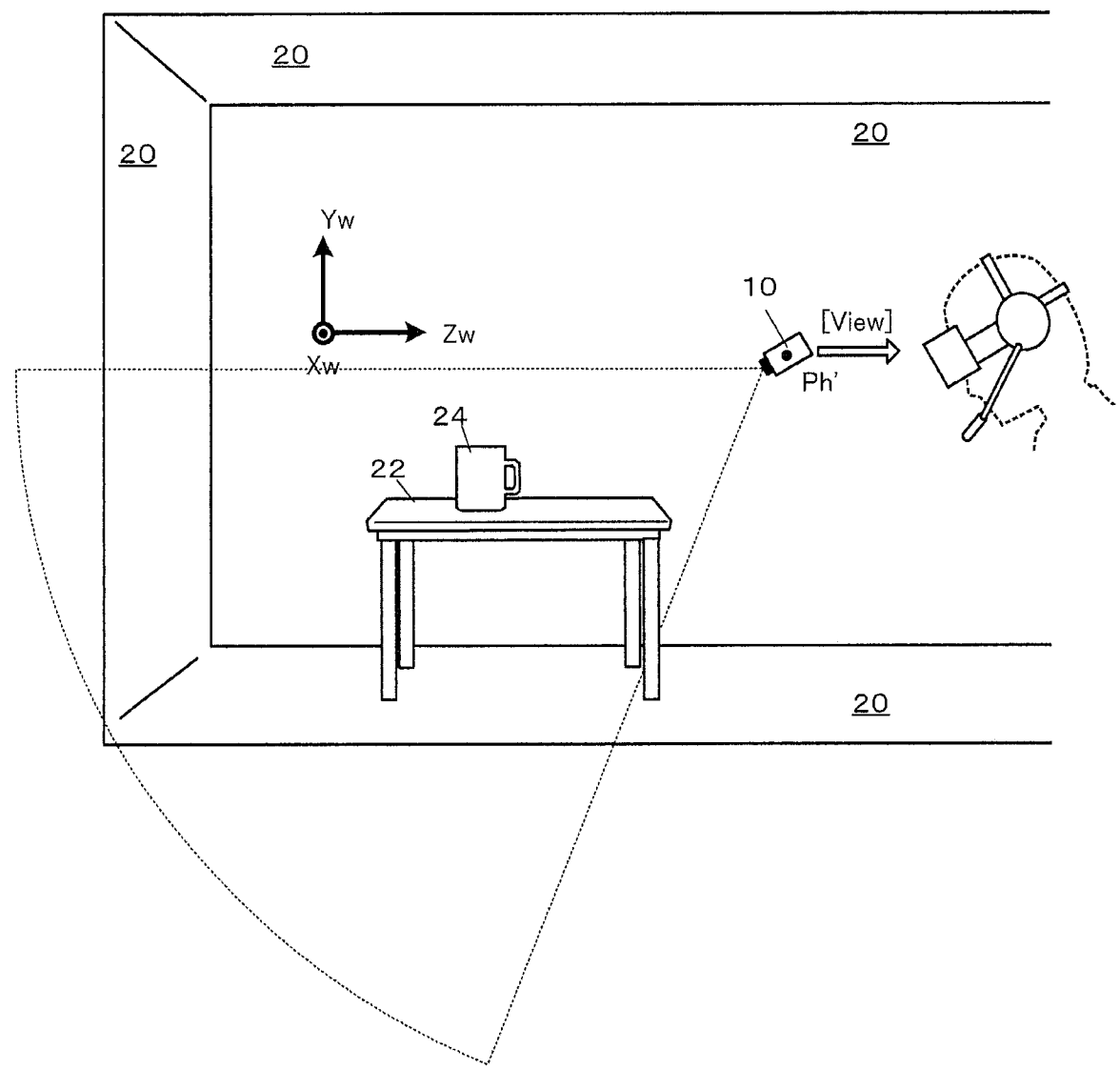
FIG. 5 is a view illustrating an example of a virtual space for generating a stereoscopic image (game image) that is displayed on an HMD, and objects that are placed in the virtual space.

FIG. 5 is a view illustrating an example of a three-dimensional virtual space for generating a game image that is displayed on the VR-HMD 1310, and objects that are placed in the three-dimensional virtual space.

The three-dimensional virtual space according to one embodiment of the invention is a game space in which various objects that form a game world are placed, and is defined by a coordinate system in which the coordinate axis directions are defined along the horizontal direction and the vertical direction of the real space. The origin of the game space is set at the same position as the origin of the ranging space, and the scale of the game space is set to be the same as that of the real space. When the player plays a game in a microscopic world (e.g., insect game), the scale of the game space may be set to differ from that of the real space. Various objects in the game world and a virtual stereo camera 10 are placed in the game space.

The virtual stereo camera 10 includes a right virtual camera and a left virtual camera (that make a pair) for generating a stereoscopic image that is displayed on the VR-HMD 1310. A rendering image of the game space that is captured by the right camera is used as a right-eye image that is displayed on the VR-HMD 1310, and a rendering image of the game space that is captured by the left camera is used as a left-eye image that is displayed on the VR-HMD 1310.

The virtual stereo camera 10 is placed at a position Ph' of the VR-HMD 1310 that is appropriately subjected to coordinate transformation from the ranging coordinate system to the coordinate system of the virtual space. The imaging angle of view of the virtual stereo camera 10 is set to be approximately the same as the angle of view of human vision. The optical axis direction is set to the direction of the longitudinal axis (X3-axis (see FIG. 3)) detected by the 6-axis sensor 1308 included in the VR-HMD 1310, and the rotation around the optical axis is controlled to be the same as the rotation around the longitudinal axis detected by the 6-axis sensor 1308. Specifically, the virtual stereo camera 10 is subjected to a head tracking control process so as to trace the motion of the head of the player 2 within an angle of view close to that of the player 2. Therefore, the player 2 can experience virtual reality as if the player 2 were in the virtual space (game space).

The objects that are placed in the game space are appropriately set corresponding to the details of the game. The objects according to one embodiment of the invention are roughly classified into an object that is not operated by the player (i.e., an object that is not operated based on an operation input performed by the player), and an object that is operated by the player.

Examples of the object that is not operated by the player include a background object that forms the game world. Note that the background object is not limited to a stationary object (e.g., building), but may be a moving object (e.g., animal, vehicle, and non-playable character (NPC) (e.g., villager)). Examples of the object that is operated by the player include a player character, and an object (e.g., weapon, protector, vehicle, item, and food) that is operated (e.g., used) by the player character. In the example illustrated in FIG. 5, a background object 20 and a table object 22 correspond to the object that is not operated by the player, and a cup object 24 corresponds to the object that is operated by the player.

Menu items are assigned to the object that is operated by the player as information about the object. An object to which the menu items are assigned is hereinafter referred to as "menu-assigned object".

The menu items may be appropriately set to the menu-assigned object corresponding to the role of the object in the game, and the details of the game. For example, when the menu-assigned object is the player character, the operation types (e.g., attack, defense, recovery, and use of item) of the character may be used as the menu items. When the menu-assigned object is the cup object 24, the way in which the player or the player character handles the object (e.g., put sugar, drink up, and knock the cup off the table) may be used as the menu items.

In one embodiment of the invention, the player can select the desired menu item by means of head tracking.

Operation Input Utilizing Head Tracking

Figure 6A:
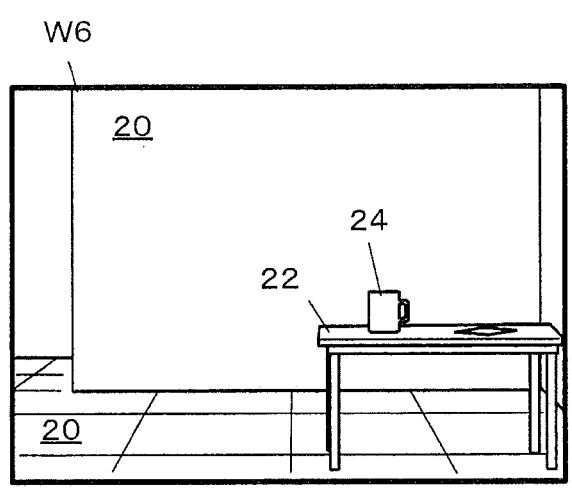
FIG. 6A is a view illustrating an example of a game screen that is displayed on an HMD.
Figure 6B:
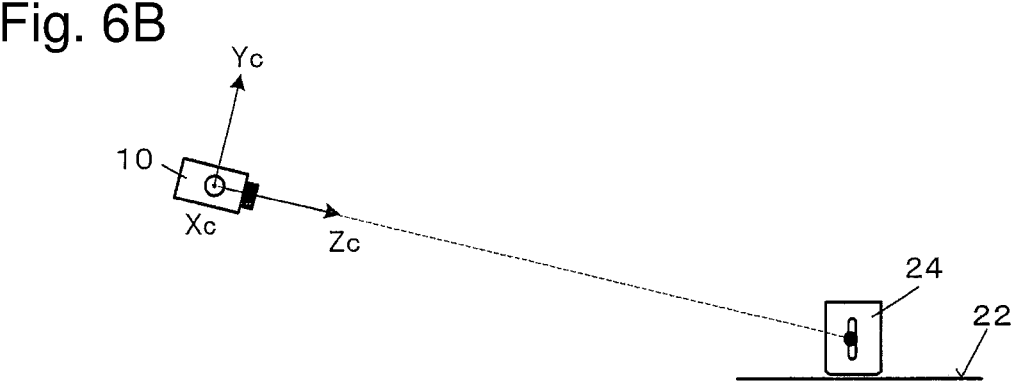
FIG. 6B is a view illustrating the relationship in distance between a virtual stereo camera and a menu-assigned object.
Figure 6C:
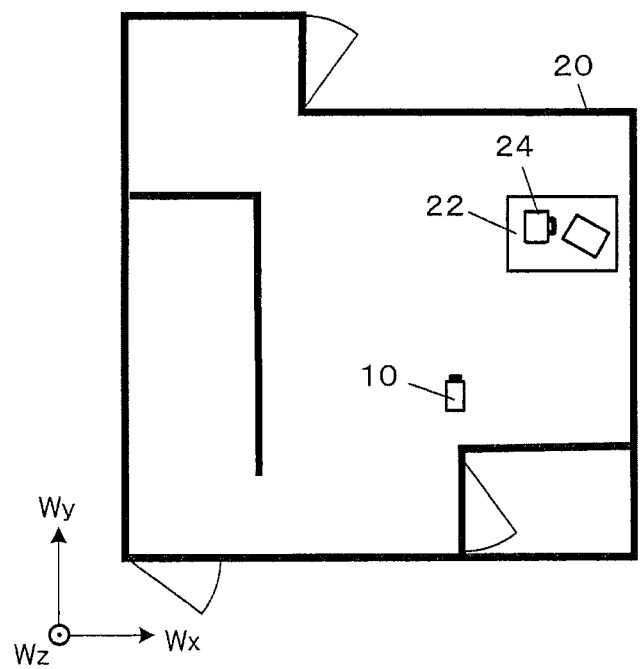
FIG. 6C is an overhead view illustrating the placement of a virtual stereo camera and a menu-assigned object in a game space.
Figure 7A:
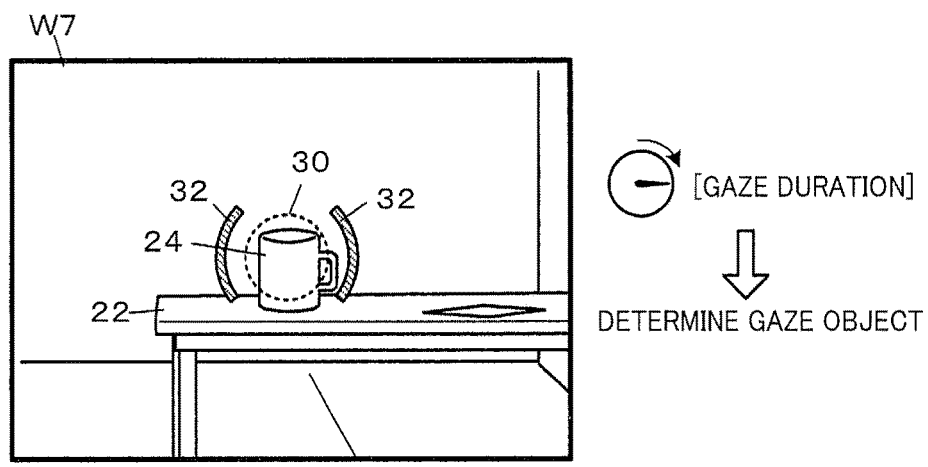
FIG. 7A is a view illustrating an example of a game screen that is displayed on an HMD.
Figure 7B:
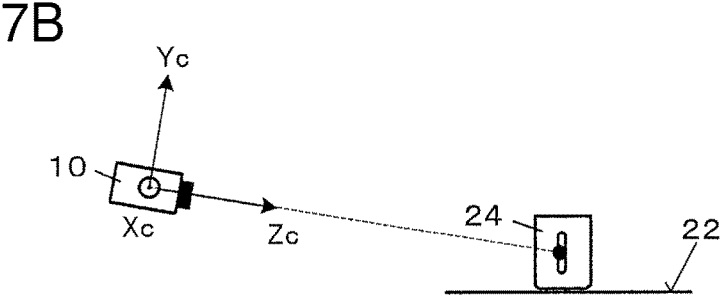
FIG. 7B is a view illustrating the relationship in distance between a virtual stereo camera and a menu-assigned object.
Figure 7C:
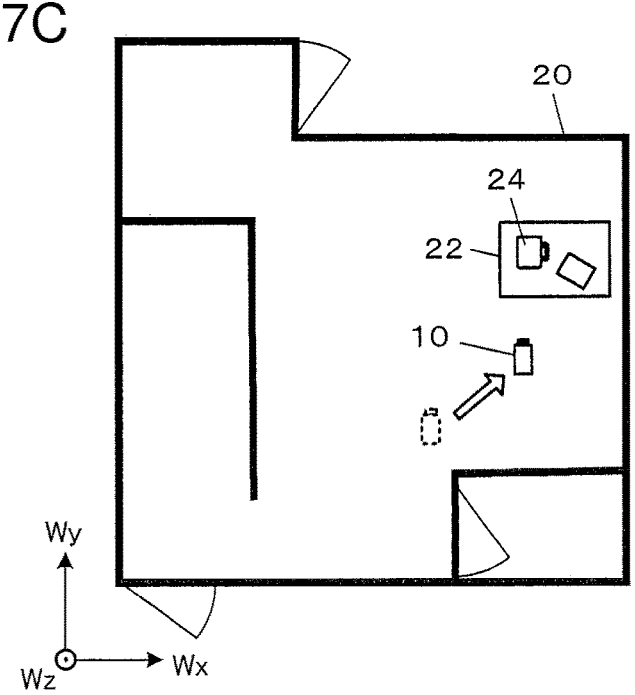
FIG. 7C is an overhead view illustrating the placement of a virtual stereo camera and a menu-assigned object in a game space.
Figure 8A:
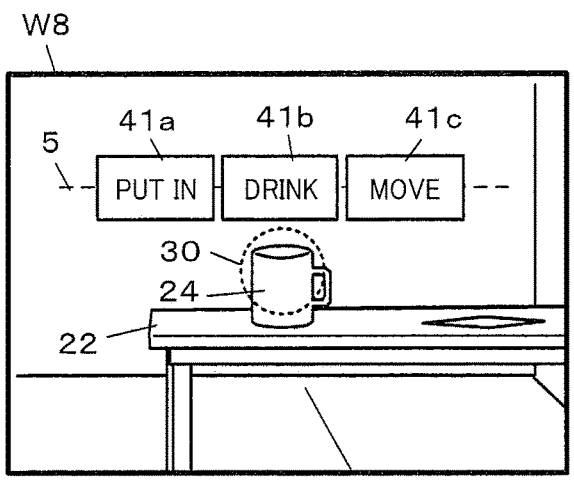
FIG. 8A is a view illustrating an example of a game screen that is displayed on an HMD.
Figure 8B:
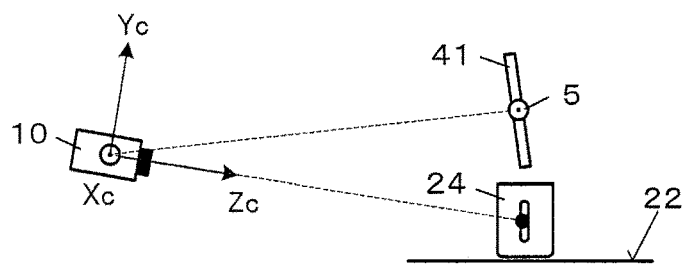
FIG. 8B is a view illustrating the relationship in distance between a virtual stereo camera and a menu-assigned object.
Figure 8C:
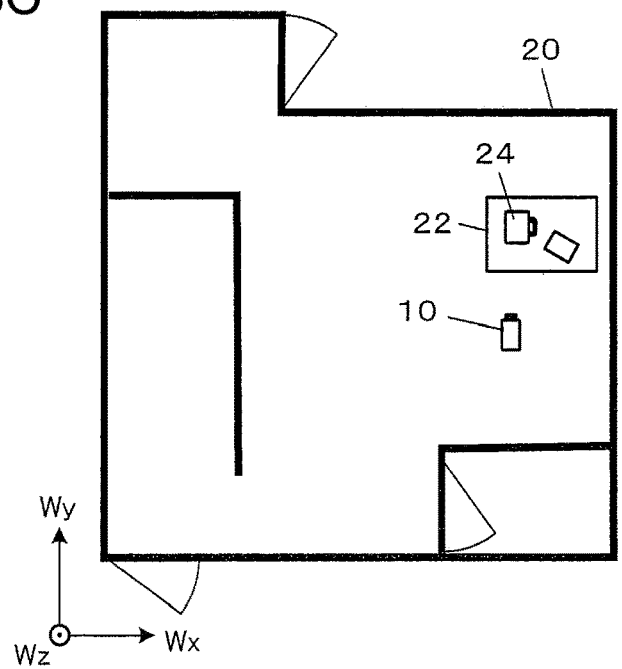
FIG. 8C is an overhead view illustrating the placement of a virtual stereo camera and a menu-assigned object in a game space.

FIGS. 6A, 7A, and 8A are views illustrating an example of the game screen that is displayed on the VR-HMD 1310, FIGS. 6B, 7B, and 8B are views illustrating the positional relationship between the virtual stereo camera 10 and the cup object 24 (i.e., menu-assigned object), and FIGS. 6C, 7C, and 8C are overhead views illustrating the arrangement (placement) of the virtual stereo camera 10 and the cup object 24 in the game space. Note that a state transition occurs in order from FIGS. 6A to 6C to FIGS. 8A to 8C. The game screen is a stereoscopic image that is displayed on the head tracking VR-HMD 1310. Specifically, the game screen is a VR-HMD image.

Since the virtual stereo camera 10 has an angle of view (e.g., about 180° in the rightward-leftward direction) close to that of human vision, the angle of view of the game screen in the rightward-leftward direction is also close to that of human vision. Note that the game screen is illustrated in the drawings using a narrower angle of view for convenience of illustration and explanation.

FIGS. 6A to 6C illustrate a state in which the player stays in a building, and the table object 22 and the cup object 24 that is placed on the table object 22 are situated in front of the player. When the player desires to perform an action on the cup object 24 in the state illustrated in FIGS. 6A to 6C, the player performs a gaze operation (also referred to as "gaze motion" (since the player merely turns his/her gaze on the desired object)) to select the cup object 24 as the action target.

As illustrated in FIGS. 7A to 7C, a gaze determination area 30 is set to the center of a game screen W7, and the player performs the gaze operation that changes the movement and the direction of the head so that the cup object 24 is situated within the gaze determination area 30 in the game space. FIGS. 7A to 7C illustrate an example in which the player has changed the direction of the head as if to approach the cup object 24 so that the cup object 24 is situated at the center of the field of view.

The gaze determination area 30 is a range that is set using the screen center point (i.e., the intersection of the line of sight of the virtual stereo camera 10 and the game screen (screen)) as a reference point. In one embodiment of the invention, the gaze determination area 30 is set to be a circular range having a size that allows a change in the line of sight due to a wobble that may occur even when the motion of the head is intentionally stopped. The gaze determination area 30 is not displayed so as to be visible, and the player cannot observe (determine) the gaze determination area 30.

When the menu-assigned object (e.g., cup object 24) has been detected within the gaze determination area 30, it is determined that the menu-assigned object is being gazed as a selection target candidate, and the gaze duration (i.e., the duration in which the menu-assigned object is detected within the gaze determination area 30) is measured. A gaze marker 32 is displayed around the menu-assigned object as a display object that notifies the player that the menu-assigned object is the gaze duration measurement target (i.e., the menu-assigned object is to be determined to be the action target of the player).

The gaze marker 32 may be appropriately designed. The display of the gaze marker 32 is controlled so that the display state of the gaze marker 32 changes with the passing of time (i.e., as the gaze duration increases). For example, the display of the gaze marker 32 is controlled so that the display color, the size, or the length of the display object changes such that the player can determine the time required for the menu-assigned object to be determined to be the action target.

When the gaze duration has reached a given determination time (e.g., about 1 to 2 seconds), the menu-assigned object is determined to be the gaze object (selected object). In this case, first-level menu display objects 41 (41*a*, 41*b*, 41*c* . . . ) are displayed around the gaze object (see the game screen W8 illustrated in FIG. 8A). The first-level menu display object 41 is a display object that represents a first-level menu item among the menu items having a hierarchical structure that are set to the gaze object (e.g., cup object 24).

In one embodiment of the invention, the menu items have a hierarchical structure. Specifically, each time the desired menu item has been selected, the contents of the selected menu item are narrowed down in terms of details. Although an example in which the number N (where N is a natural number) of levels of the hierarchical structure is "3" is described below, the number N of levels may be "2", or may be "4" or more.

The first-level menu display objects 41 are displayed so as to be arranged along a reference direction 5 that is set to the gaze object (cup object 24) in advance. The first-level menu display objects 41 that are displayed as described above are subjected to a billboard process so that the reference plane (e.g., front side) of each first-level menu display object 41 always faces the virtual stereo camera 10. Note that the billboard process may be omitted.

The reference direction 5 defines the relative relationship of the arrangement direction of the menu display objects with respect to at least the line-of-sight direction of the virtual stereo camera 10. The reference direction 5 is reference information for displaying the menu display objects that are set to the gaze object at positions at which the menu display objects can be easily observed with respect to the placement state of the gaze object. The reference direction 5 is defined based on the placement position of the gaze object.

In the example illustrated in FIGS. 8A to 8C, the reference direction 5 of the cup object 24 (i.e., gaze object) is set to extend along the rightward-leftward direction axis (Xc-axis) of the orthogonal 3-axis field-of-view coordinate system of the virtual stereo camera 10 at a position above the cup object 24. Note that the reference direction 5 may be set to extend along the upward-downward direction axis (Yc-axis) or the depth direction axis (Zc-axis) of the field-of-view coordinate system.

FIGS. 8A to 8C illustrate an example of the relative positional relationship in which the handle of the cup is situated on the right side with respect to the virtual stereo camera 10. Note that the first-level menu display objects 41 are also arranged in the rightward-leftward direction with respect to the virtual stereo camera 10 at positions above the gaze object (cup object 24) as illustrated in FIGS. 8A to 8C even when the handle of the cup is situated on the back side with respect to the virtual stereo camera 10, or the cup lies on its side.

Figure 10:
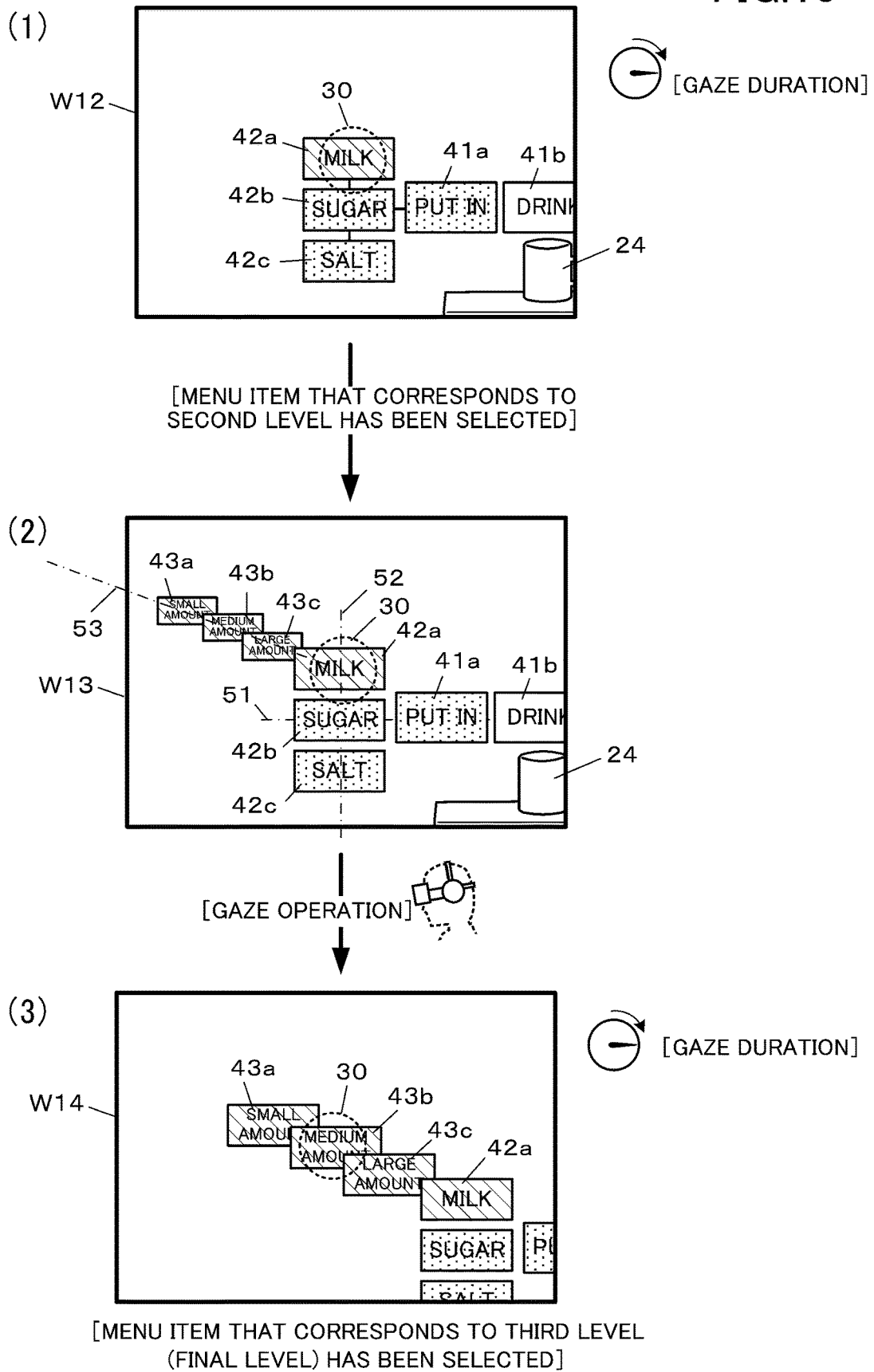
FIG. 10 is a view illustrating a menu display object selection method (i.e., menu item selection method) (see FIG. 9).

FIGS. 9 and 10 are views illustrating a menu display object selection method (i.e., menu item selection method). Note that a state transition occurs in order from FIG. 9 to FIG. 10.

When the player selects one of the first-level menu display objects 41 on the game screen W9 illustrated in FIG. 9 (see (1) (corresponding to FIG. 8A)), the player performs the gaze operation so that at least part of the desired first-level menu display object 41 is displayed within the gaze determination area 30. Specifically, the player turns his/her head so as to change the line-of-sight direction.

When the first-level menu display object 41 has been detected within the gaze determination area 30 (see the game screen W10 illustrated in FIG. 9 (see (2))), the gaze duration is measured. When a plurality of first-level menu display objects 41 have been detected within the gaze determination area 30, the gaze duration may be measured with respect to the object that is shortest in terms of the distance between the center of the object and the center of the gaze determination area 30, or may be measured with respect to the object that is largest in terms of the area displayed within the gaze determination area 30, for example.

When the gaze duration has reached the determination time, the first-level menu display object 41 for which the gaze duration has been measured is determined to be the gaze object, and it is determined that the first-level menu item assigned to the first-level menu display object 41 has been selected. The first-level menu display object 41 (the first-level menu display object 41a in the example illustrated in FIG. 9) is displayed in an identifiable manner (i.e., the selected menu item is displayed in an identifiable manner).

When the final level (lowest level) of the hierarchical structure has not been reached, menu display objects that belong to the lower level and correspond to the selected menu item are displayed (see the game screen W11 illustrated in FIG. 9 (see (3))).

Specifically, (n+1)th-level menu display objects are displayed so as to be arranged in the direction that intersects the arrangement direction of the nth-level menu display objects. The display position and the display state when displaying the (n+1)th-level menu display objects are set so that the nth-level menu display object that corresponds to the (n+1)th-level menu display objects to be displayed can be determined. In the example illustrated in FIG. 9 (see (3)), the selected nth-level menu display object and the (n+1)th-level menu display objects are displayed in the same display color in order to explicitly show the relationship therebetween. Note that the menu display objects may be displayed in another display state. For example, the menu display objects may be displayed to have a similar shape, or the selected nth-level menu display object and the (n+1)th-level menu display objects may be displayed in a linked manner.

In one embodiment of the invention, the first-level menu display objects 41 are arranged along the rightward-leftward direction axis 51 (Xc-axis) of the field-of-view coordinate system of the virtual stereo camera 10, and second-level menu display objects 42 (42a, 42b, 42c, . . . ) are displayed so as to be arranged along an upward-downward direction axis 52 (Yc-axis) of the field-of-view coordinate system of the virtual stereo camera 10.

When the player selects one of the second-level menu display objects 42, the player performs the gaze operation so that the desired second-level menu display object 42 is displayed within the gaze determination area 30 (see the game screen W12 illustrated in FIG. 10 (see (1))) in the same manner as in the case of selecting the desired first-level menu display object 41. When the gaze duration of the second-level menu display object 42 displayed within the gaze determination area 30 has reached the determination time, it is determined that the menu item assigned to the second-level menu display object 42 has been selected.

When menu items that belong to the lower level are set to the selected menu item, (n+2)th-level menu display objects are displayed (see the game screen W13 illustrated in FIG. 10 (see (2))). In one embodiment of the invention, the first-level menu display objects 41 are arranged along the rightward-leftward direction axis 51 (Xc-axis) of the field-of-view coordinate system of the virtual stereo camera 10, the second-level menu display objects 42 are arranged along the upward-downward direction axis 52 (Yc-axis) of the field-of-view coordinate system of the virtual stereo camera 10, and third-level menu display objects 43 (43a, 43b, . . . ) are arranged along a depth direction axis 53 (Zc-axis) of the field-of-view coordinate system of the virtual stereo camera 10.

When the player selects one of the third-level menu display objects 43, the player performs the gaze operation so that the desired third-level menu display object 43 is displayed within the gaze determination area 30 (see the game screen W14 illustrated in FIG. 10 (see (3))). When the selected menu item corresponds to the final level (deepest level or lowest level), the menu item that has been selected corresponding to each level is reflected in the game control process. For example, when the menu items have been selected as illustrated in FIGS. 6A to 10, a motion that puts a medium amount of miik in the cup object 24 is performed.

Note that the menu display object that has been selected by the player and belongs to the lowest level is automatically adjusted so that the menu display object is situated within a given range within the game screen even when the relative distance between the virtual stereo camera 10 and the gaze object has changed.

Figure 11:
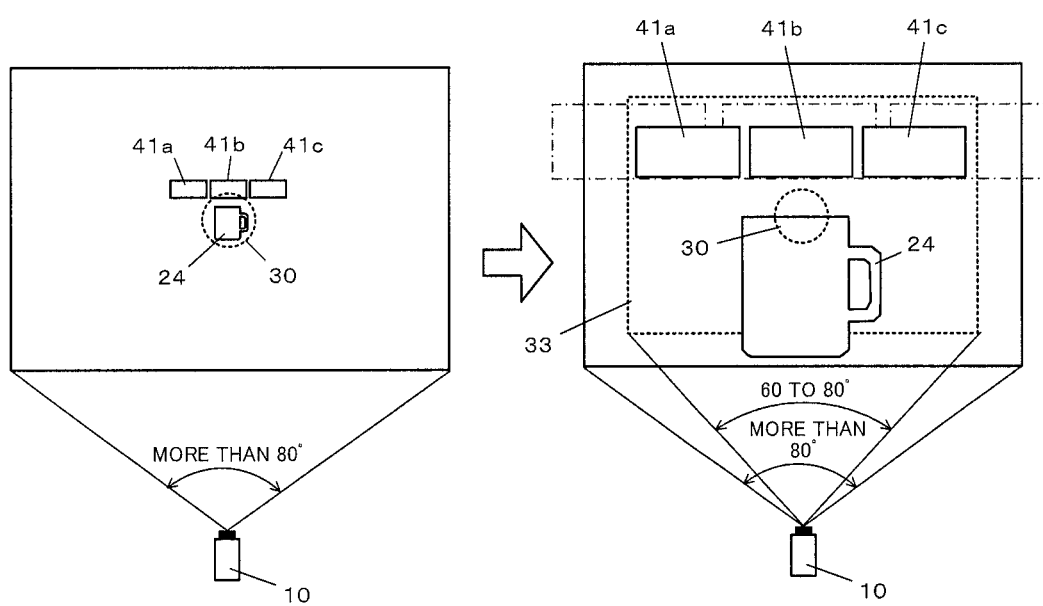
FIG. 11 is a view illustrating an adjustment of the display size of a menu display object.

For example, when the virtual stereo camera 10 approaches the gaze object (cup object 24) in a state in which the first-level menu display objects 41 are displayed (see FIG. 11), part of the first-level menu display objects 41 may be situated outside the game screen (see the dash-dotted lines illustrated in FIG. 11 (see (2))). In this case, the display size of the first-level menu display objects 41 (e.g., lowest-level menu display objects) is changed so that the first-level menu display objects 41 are situated within a recommended range 33 (that is not displayed).

The recommended range 33 may be set appropriately. It is preferable to set the recommended range 33 so as to correspond to a given angle (e.g., 60 to 80°) in terms of the horizontal angle of view of the VR-HMD 1310 with respect to the line-of-sight direction within the imaging angle of view (i.e., the angle of view corresponding to the entire game screen (maximum angle of view)) of the virtual stereo camera 10. When the total size of the menu display objects 41 in the rightward-leftward direction has exceeded the given angle, the total display size of the menu display objects 41 is adjusted so as to fall within the above angle-of-view range. A horizontal angle of view of 60 to 80° with respect to the line-of-sight direction is smaller than the maximum horizontal angle of view, and falls within the range of the effective angle of view that corresponds to the field of view of a human obtained without turning his/her head. The maximum horizontal angle of view (e.g., about 180°) of the VR-HMD 1310 is close to the angle of view of human vision, and the angle of view (e.g., about 180°) of the virtual stereo camera 10 is also close to the angle of view of human vision. Therefore, the horizontal angle of view corresponding to the game screen is greater than 80°.

When the player has turned the line-of-sight direction toward the center of the screen so that the gaze object (cup object 24) is situated within the gaze determination area 30, the menu display objects that belong to the lower level are displayed within the recommended range 33. Therefore, it is unnecessary for the player to turn his/her head in order to observe the menu item candidates.

Functional Configuration

A functional configuration example for implementing one embodiment of the invention is described below.

Figure 12:
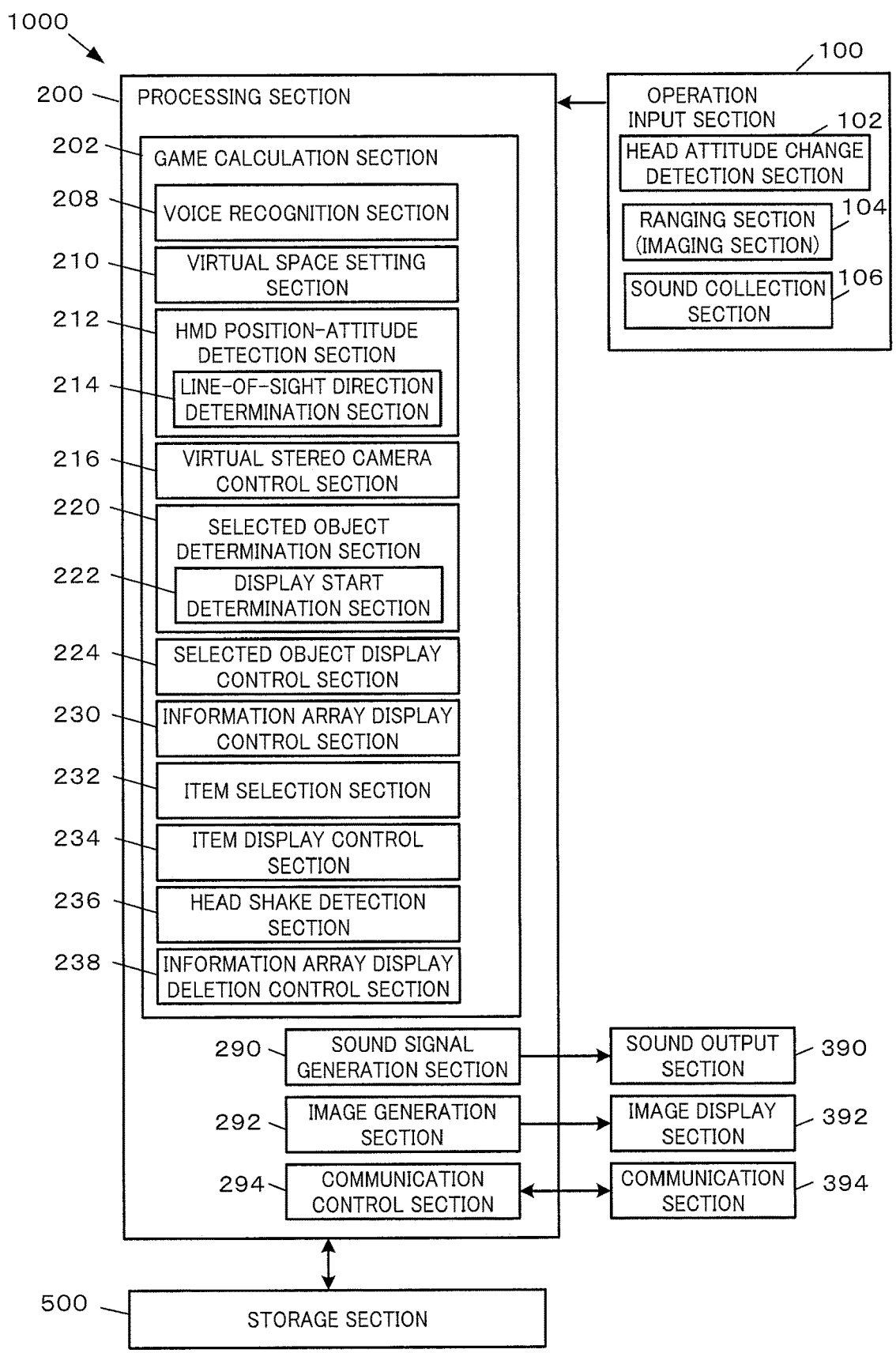
FIG. 12 is a functional block diagram illustrating a functional configuration example of a game device.

FIG. 12 is a functional block diagram illustrating a functional configuration example of the game device 1000 according to one embodiment of the invention. The game device 1000 according to one embodiment of the invention includes an operation input section 100, a processing section 200, a sound output section 390, an image display section 392, a communication section 394, and a storage section 500.

The operation input section 100 is a means that allows the player to perform various input operations. The operation input section 100 may be implemented by a known operation input device, such as a joystick, a push switch, a lever, a volume, a pedal switch, a keyboard, a mouse, a trackpad, a trackball, or a gesture input device. In one embodiment of the invention, the touch panel 1004 and the game controller 1200 (see FIG. 1) correspond to the operation input section 100. The VR-HMD 1310 also corresponds to the operation input section 100 since the player can perform a selection operation using a line-of-sight direction.

The operation input section 100 according to one embodiment of the invention includes a head attitude change detection section 102, a ranging section 104, and a sound collection section 106.

The head attitude change detection section 102 detects the attitude of the head of the player 2 and a change in the attitude of the head of the player 2, and outputs a detection signal to the processing section 200. For example, the head attitude change detection section 102 may be implemented by utilizing a gyro sensor or an acceleration sensor, or utilizing known head tracking technology that recognizes a human head from an image captured by an image sensor. In one embodiment of the invention, the VR-HMD 1310 (i.e., 6-axis sensor 1308 and IC chip 1309) included in the headset 1300 (see FIG. 3) corresponds to the head attitude change detection section 102. The range sensor unit 1100 also corresponds to the head attitude change detection section 102 when the attitude of the VR-HMD 1310 is calculated by image processing from the image captured by the range sensor unit 1100.

The ranging section 104 captures the player 2 and the state around the player 2 in a given cycle to measure the distance to each object, and successively outputs the captured image data and the ranging results to the processing section 200. In one embodiment of the invention, the range sensor unit 1100 (see FIG. 1) corresponds to the ranging section 104.

The sound collection section 106 collects the voice of the player, converts the collected voice into an electrical signal, and outputs the electrical signal. In the example illustrated in FIG. 3, the microphone 1304 corresponds to the sound collection section 106.

The processing section 200 is implemented by electronic parts such as a microprocessor (e.g., CPU and GPU), an application-specific integrated circuit (ASIC), FPGA, and an IC memory. The processing section 200 exchanges data with each functional section including the operation input section 100 and the storage section 500. The processing section 200 performs various calculation processes based on a given program, data, and an input signal from the operation input section 100 and the like, and controls the operation of the game device 1000. In one embodiment of the invention, the control board 1050 (see FIG. 1) corresponds to the processing section 200.

The processing section 200 includes a game calculation section 202, a sound signal generation section 290, an image generation section 292, and a communication control section 294.

The game calculation section 202 includes a voice recognition section 208, a virtual space setting section 210, an HMD position-attitude detection section 212, a virtual stereo camera control section 216, a selected object determination section 220, a selected object display control section 224, an information array display control section 230, an item selection section 232, an item display control section 234, a head shake detection section 236, and an information array display deletion control section 238. The game calculation section 202 performs various game play-related processes.

The voice recognition section 208 recognizes the words produced by the player from the player's voice collected by the sound collection section 106, and converts the recognized words into text information. Note that the voice recognition section 208 may be implemented by appropriately utilizing known voice recognition technology.

The virtual space setting section 210 sets a game space in which a plurality of objects are placed, to be the virtual space for generating the VR-HMD image. The virtual space setting section 210 places various objects (e.g., an object that forms the background, an NPC object (e.g., enemy character object), and an object that is operated by the player (e.g., player character)) in the game space, and controls the position and the attitude of each object.

The HMD position-attitude detection section 212 performs a process that detects the position and the attitude of the VR-HMD 1310. In one embodiment of the invention, the HMD position-attitude detection section 212 detects the position and the attitude of the VR-HMD 1310 in the ranging space (see FIG. 4). The HMD position-attitude detection section 212 includes a line-of-sight direction determination section 214, and can determine the line-of-sight direction of the VR-HMD 1310 in the game space.

The virtual stereo camera control section 216 controls the position and the attitude of the virtual stereo camera 10 in the game space so as to reproduce the position and the attitude of the VR-HMD 1310 in the ranging space (that have been detected by the HMD position-attitude detection section 212) (see FIGS. 4 and 5). In other words, the virtual stereo camera control section 216 performs a head tracking control process that synchronizes the position and the attitude of the virtual stereo camera 10 with a change in the attitude of the head of the player 2 based on detection information from the head attitude change detection section 102. The angle of view of the virtual stereo camera 10 is (approximately) the same as the angle of view (from >80° to about 180°) of human vision.

The selected object determination section 220 performs a determination process on the object that has been selected by the player from the objects placed in the game space.

More specifically, the selected object determination section 220 determines the menu display object that corresponds to the menu item that has been recognized by the voice recognition section 208 to be the selected object.

The selected object determination section 220 includes a gaze object determination section 221. The selected object determination section 220 detects an object among a plurality of objects placed in the game space that has been situated to intersect the line-of-sight direction of the virtual stereo camera 10, and determines the detected object to be the gaze object (selected object) using the detection result. In other words, the selected object determination section 220 performs a process that sets the object displayed within the gaze determination area 30 to be the gaze object.

The selected object determination section 220 includes a display start determination section 222.

The display start determination section 222 measures the gaze duration (selection duration) (i.e., the duration in which an identical object is continuously selected (subjected to a gaze)) based on the line-of-sight direction of the virtual stereo camera 10, and determines whether or not to place (display) the information array. In one embodiment of the invention, the display start determination section 222 determines whether or not to start the display of the menu display objects.

The display start determination section 222 displays a notification object (gaze marker 32 (see FIG. 6)) that notifies that the object is being selected during the measurement period so that the display state of the notification object is changed corresponding to the duration.

The selected object display control section 224 performs a control process that displays the selected object in an identifiable manner (see FIG. 9 (see (2))).

The information array display control section 230 performs a control process that places (displays) an information array in the virtual space so as to satisfy a given placement condition, a plurality of information arrangement directions being defined in a relative and three-dimensional manner with respect to the information array. More specifically, the information array display control section 230 places (displays) the information array in the virtual space so that the position of the gaze object (selected object) serves as a base point, and the information arrangement direction has a given relative relationship with respect to the line-of-sight direction of the virtual stereo camera 10. In one embodiment of the invention, the information array display control section 230 controls the display of the menu display objects.

More specifically, the information array display control section 230 1) changes the size of the selection target menu display objects corresponding to the distance from the position of the virtual stereo camera 10 (that corresponds to the viewpoint position of the VR-HMD 1310) to the gaze object (selected object) in the game space (see FIG. 11). Specifically, when the size of the information array in the rightward-leftward direction exceeds the recommended range 33 that is defined by a given angle range that falls within a horizontal angle of view of 60 to 80° with respect to the line-of-sight direction, the information array display control section 230 changes the size of the information array so that the information array is situated within the recommended range 33.

The information array display control section 230 2) places (displays) the information array so that the information arrangement direction that corresponds to the first level extends along the reference direction 5 that is linked to the gaze object (selected object). In one embodiment of the invention, the information array display control section 230 places (displays) the first-level menu display objects 41 along the reference direction 5.

The information array display control section 230, 3) places (displays) the information array that corresponds to a lower level in the information arrangement direction from a position that is visually linked to the selected information included in the information array that corresponds to the immediately higher level (see FIG. 9 (see (3)) and FIG. 10 (see (2))).

The item selection section 232 selects an item from the items displayed in the form of an information array in order from the highest level. In one embodiment of the invention, the item selection section 232 selects the menu item that is linked to the object among the menu display objects (that are displayed in order from the highest level) that has been determined to be the gaze object (selected object).

The item display control section 234 displays the menu item selected by the item selection section 232 in an identifiable manner (see FIG. 9 (see (2))).

The head shake detection section 236 detects a head shake motion performed by the player as a display cancellation operation that cancels and deletes the display of the information array. For example, the head shake detection section 236 detects whether or not the pattern detected by the head attitude change detection section 102 is a given change pattern (e.g., a pattern in which an acceleration or an angular velocity equal to or greater than a given level is detected in the horizontal direction, and the direction (positive/negative) thereof changes in a given cycle).

The information array display deletion control section 238 deletes the information array (deletes the display of the information array) when the head shake detection section 236 has detected a head shake motion performed by the player.

The game calculation section 202 may also perform a process that renders the image of the game space captured by the virtual stereo camera 10, and displays the resulting image on the VR-HMD 1310 as a stereoscopic image, a game end determination process, a game result calculation process, and the like. The game calculation section 202 may appropriately perform an additional process corresponding to the details of the game.

The sound signal generation section 290 is implemented by known technology (e.g., a microprocessor such as a digital signal processor (DSP), and a control program). The sound signal generation section 290 generates a sound signal of a game sound (e.g., effect sound, background music (BGM), and operation sound) based on the processing results of the game calculation section 202, and outputs the generated sound signal to the sound output section 390.

The sound output section 390 is implemented by a device that outputs sound (e.g., effect sound and BGM) based on the sound signal input from the sound signal generation section 290. The headphone 1302 included in the headset 1300 (see FIG. 3) corresponds to the sound output section 390.

The image generation section 292 renders the state within the virtual space viewed from the virtual stereo camera 10 to generate a stereoscopic image, and outputs an image signal for displaying the stereoscopic image to the image display section 392.

The image display section 392 displays the image generated by the image generation section 292. For example, the image display section 392 is implemented by an image display device such as a flat panel display, a cathode-ray tube (CRT), or a projector. The touch panel 1004 (see FIG. 1) and the VR-HMD 1310 (see FIG. 3) correspond to the image display section 392.

The communication control section 294 performs a data communication process to exchange data with an external device through the communication section 394.

The communication section 394 is implemented by a transceiver, a modem, a terminal adapter (TA), a jack for a communication cable, a control circuit, and the like. The communication section 394 communicates with an external server system or the like through a communication network.

The storage section 500 stores a program, data, and the like that implement a function that causes the processing section 200 to control the game device 1000. The storage section 500 is used as a work area for the processing section 200, and temporarily stores the data input from the operation input section 100, the results of calculations performed by the processing section 200, and the like. The function of the storage section 500 is implemented by an IC memory (e.g., RAM or ROM), a magnetic disk (e.g., hard disk), an optical disk (e.g., CD-ROM or DVD), or the like. The IC memory 1052 (see FIG. 1) corresponds to the storage section 500.

Figure 13:
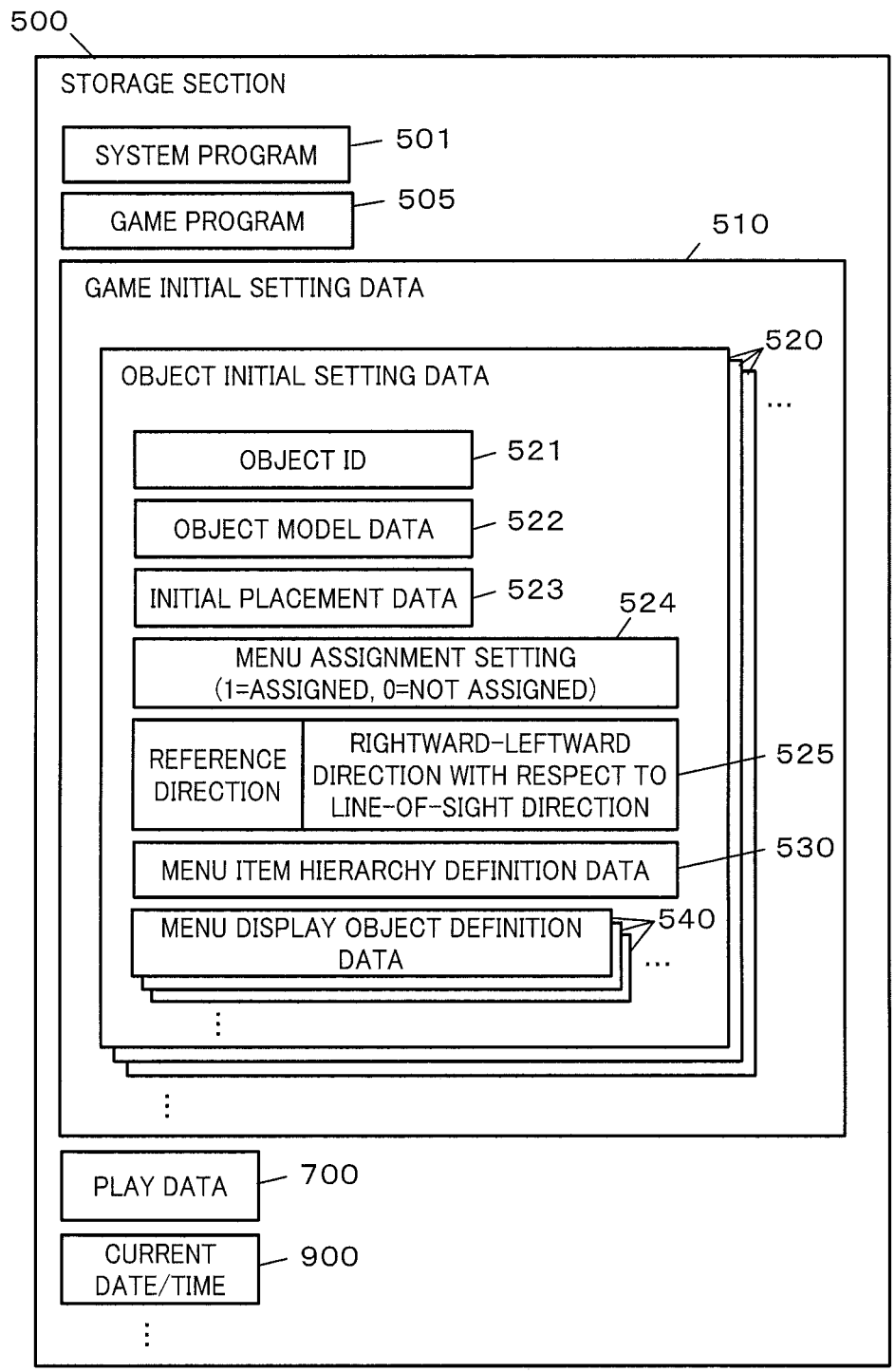
FIG. 13 is a view illustrating an example of a program and data that are stored in a storage section of a game device.

FIG. 13 is a view illustrating an example of the program and the data stored in the storage section 500 according to one embodiment of the invention. The storage section 500 stores a system program 501, a game program 505, game initial setting data 510, play data 700, and a current date/time 900. Note that the storage section 500 may appropriately store additional information.

The processing section 200 reads and executes the system program 501, and causes the game device 1000 to implement a basic input-output function necessary for a computer.

The game program 505 is a program that causes the processing section 200 to implement the function of the game calculation section 202.

The game initial setting data 510 includes various types of initial setting data used for the game. In one embodiment of the invention, the game initial setting data 510 includes a plurality of pieces of object initial setting data 520 that are provided corresponding to each object that is placed in the game space.

The object initial setting data 520 includes 1) a specific object ID 521, 2) object model data 522 for displaying the object within the game screen, 3) initial placement data 523 that defines the initial placement state within the game space, 4) a menu assignment setting 524 that represents whether or not the object is the menu-assigned object (i.e., whether or not a menu is displayed corresponding to the object), 5) a reference direction 525, 6) menu item hierarchy definition data 530, and 7) menu display object definition data 540. Note that the object initial setting data 520 may optionally include additional data.

Figure 14:
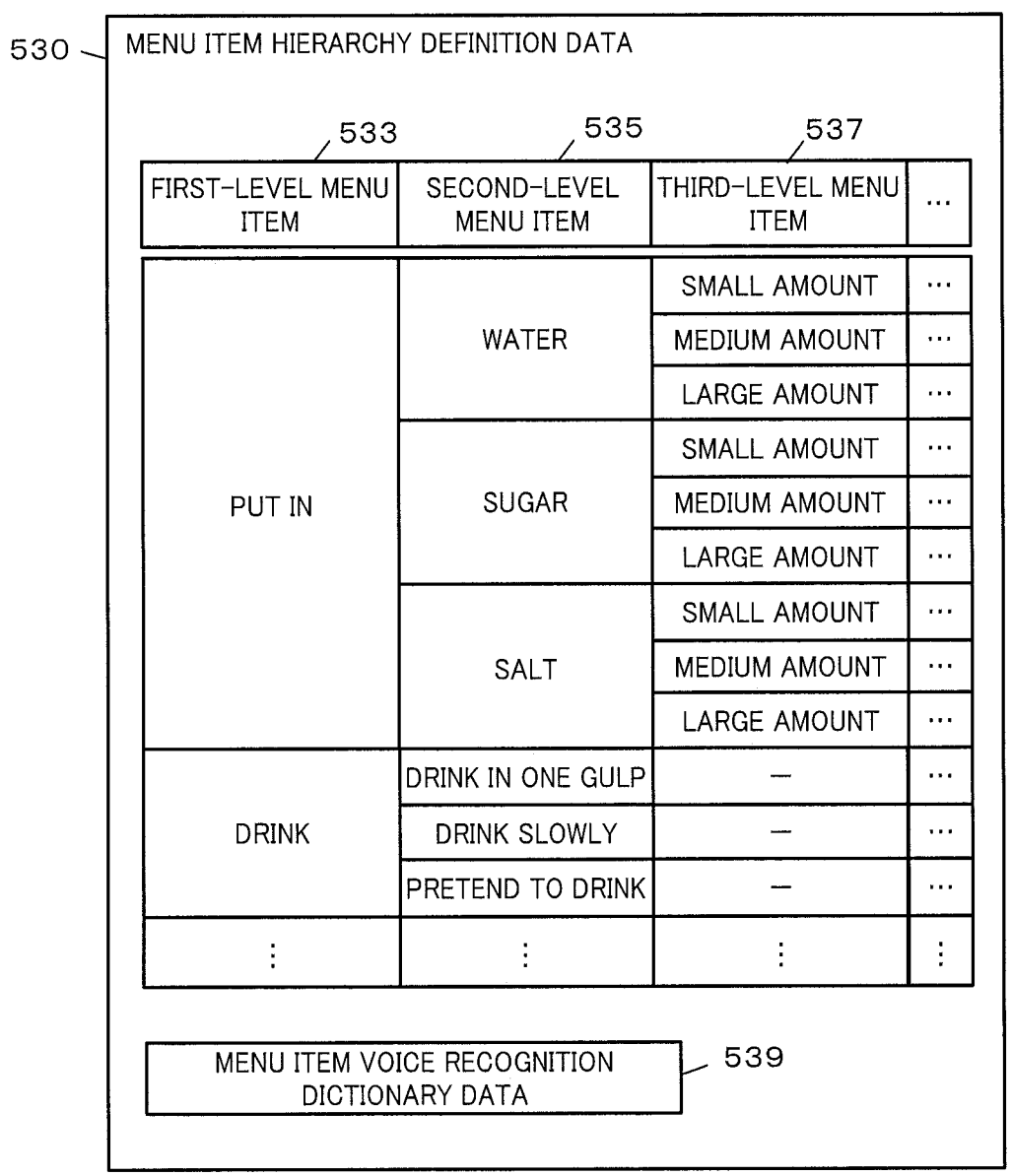
FIG. 14 is a view illustrating a data configuration example of menu item hierarchy definition data.

FIG. 14 is a view illustrating a data configuration example of the menu item hierarchy definition data 530.

The menu item hierarchy definition data 530 defines the hierarchical structure of the menu items of the object. For example, the menu item hierarchy definition data 530 includes first-level menu items 533, second-level menu items 535, third-level menu items 537, and the like in a linked manner.

The menu item hierarchy definition data 530 also includes menu item phonetic dictionary data 539 (i.e., phonetic dictionary data) that is used to recognize a voice that reads each menu item (e.g., first-level menu items 533, second-level menu items 535, and third-level menu items 537).

Figure 15A:
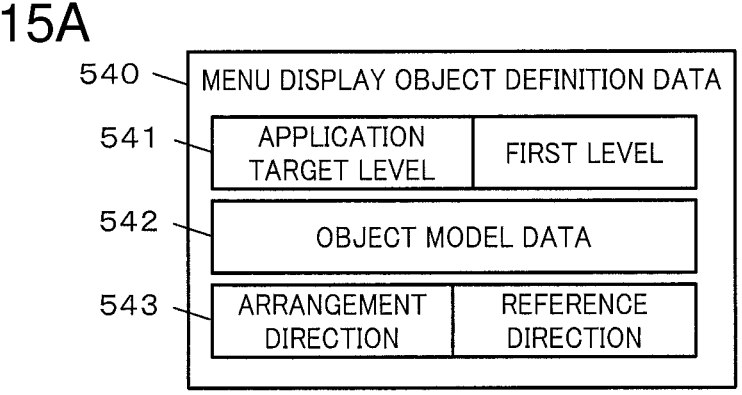
FIGS. 15A to 15C are views illustrating a data configuration example of menu display object definition data.
Figure 15B:
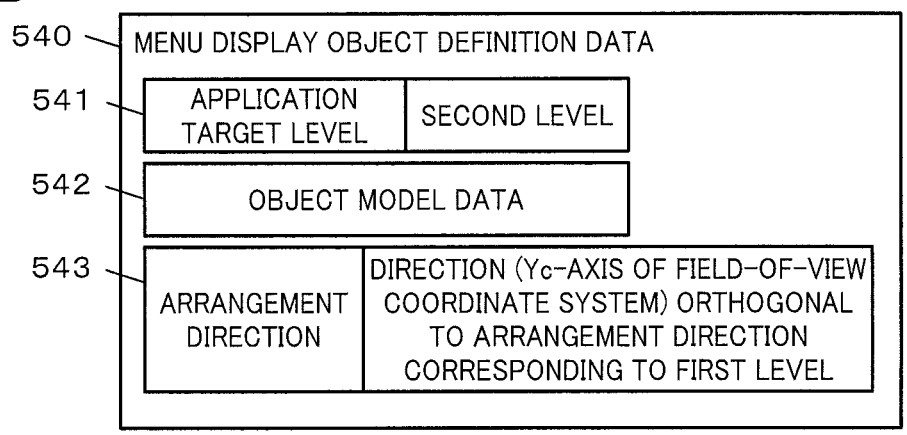
Figure 15C:
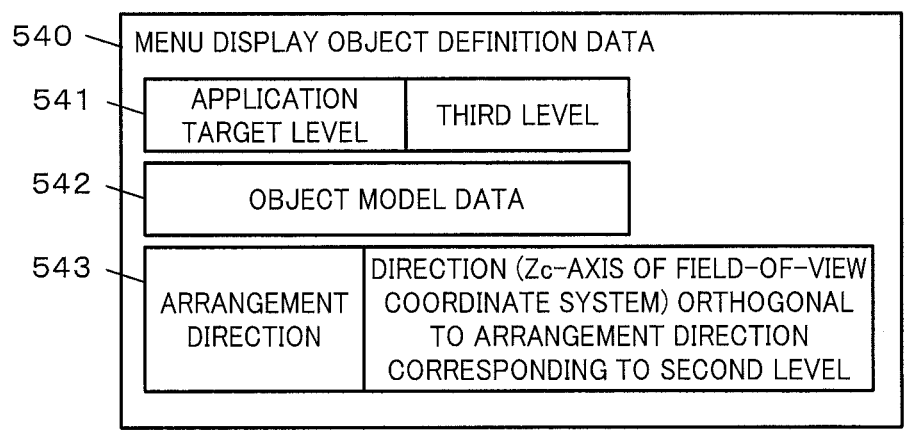

FIGS. 15A to 15C are views illustrating a data configuration example of the menu display object definition data 540.

The menu display object definition data 540 is provided corresponding to each level defined by the menu item hierarchy definition data 530, and defines the display state of the menu display object. The menu display object definition data 540 includes an application target level 541 to which the data is applied, object model data 542 that is applied to the menu display object, and a menu display object arrangement direction 543.

Figure 16:
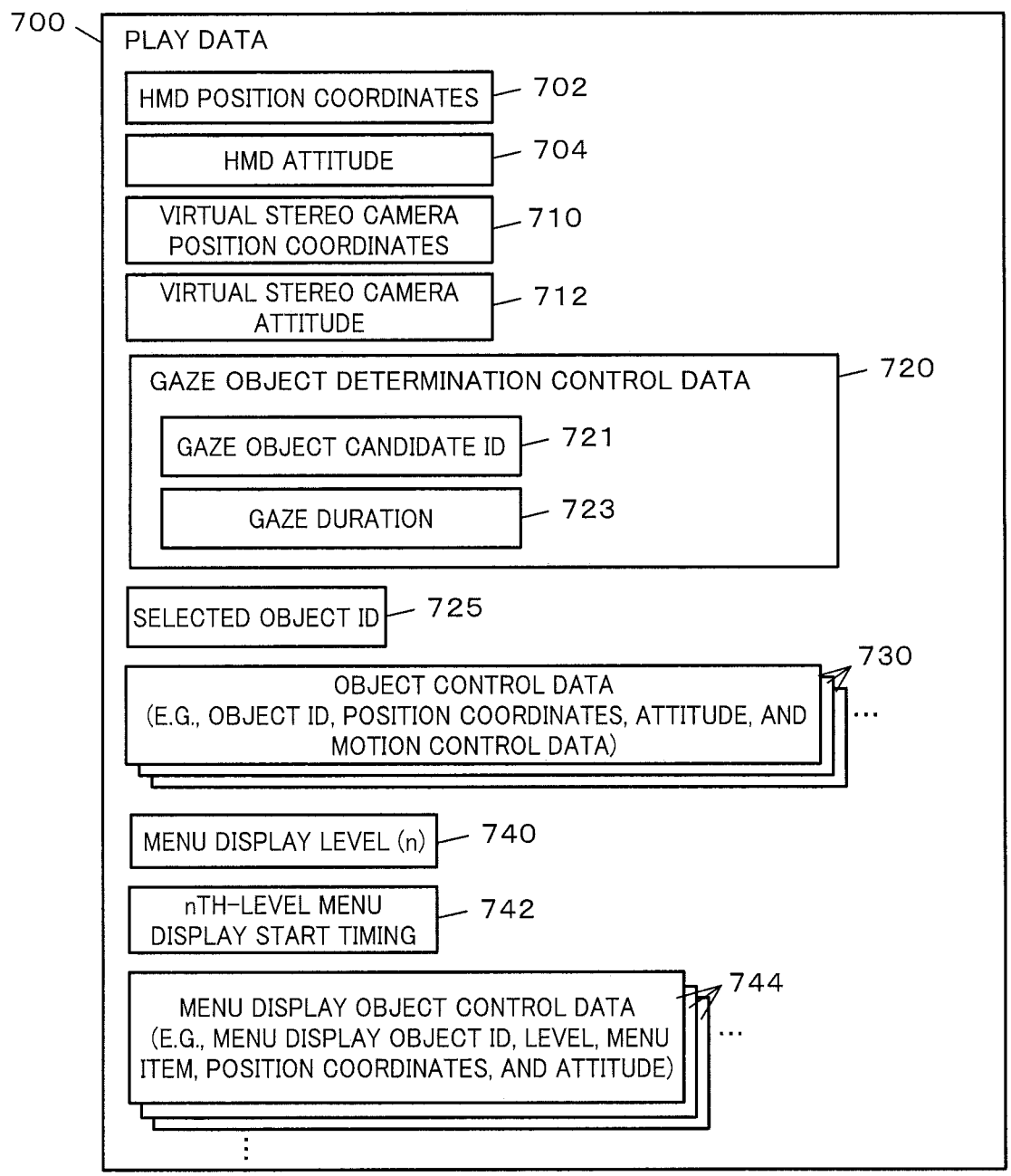
FIG. 16 is a view illustrating a data configuration example of play data.

FIG. 16 is a view illustrating an example of the data configuration of the play data 700.

The play data 700 includes various types of data that describe the progress of the game. For example, the play data 700 includes HMD position coordinates 702, an HMD attitude 704, virtual stereo camera position coordinates 710, a virtual stereo camera attitude 712, gaze object determination control data 720, selected object ID 725, object control data 730, a menu display level 740, an nth-level menu display start timing 742, and menu display object control data 744. Note that the play data 700 may optionally include additional data.

The gaze object determination control data 720 includes data for determining the gaze object (selected object) from the objects placed in the game space based on the line-of-sight direction of the VR-HMD 1310. For example, the gaze object determination control data 720 includes a gaze object candidate ID 721 that includes identification information about an object that may be determined to be the gaze object, and a gaze duration 723. The initial value of the gaze object candidate ID 721 is set to "undetermined", and the initial value of the gaze duration 723 is set to "0".

The selected object ID 725 is identification information about an object that has been determined to be the gaze object (selected object). The initial value of the selected object ID 725 is set to "undetermined".

The object control data 730 is provided corresponding to each object placed in the game space, and includes various types of data that describe the state of the object. For example, the object control data 730 includes the object ID, the position coordinates, the attitude, and motion control data (e.g., speed control data and motion control data). Note that the object control data 730 may optionally include additional data.

The menu display level 740 represents the level of the menu item that is displayed using the menu display object. The level of the menu item that is displayed using the menu display object is represented by a variable "n".

The nth-level menu display start timing 742 includes the display start timing (e.g., date/time) of the nth-level menu display objects.

The menu display object control data 744 is provided corresponding to each menu display object, and includes various types of data that describe the state of the object. For example, the menu display object control data 744 includes the menu display object ID, the level, the corresponding menu item, the position coordinates, and the attitude. Note that the menu display object control data 744 may optionally include additional data.

Operation

Figure 17:
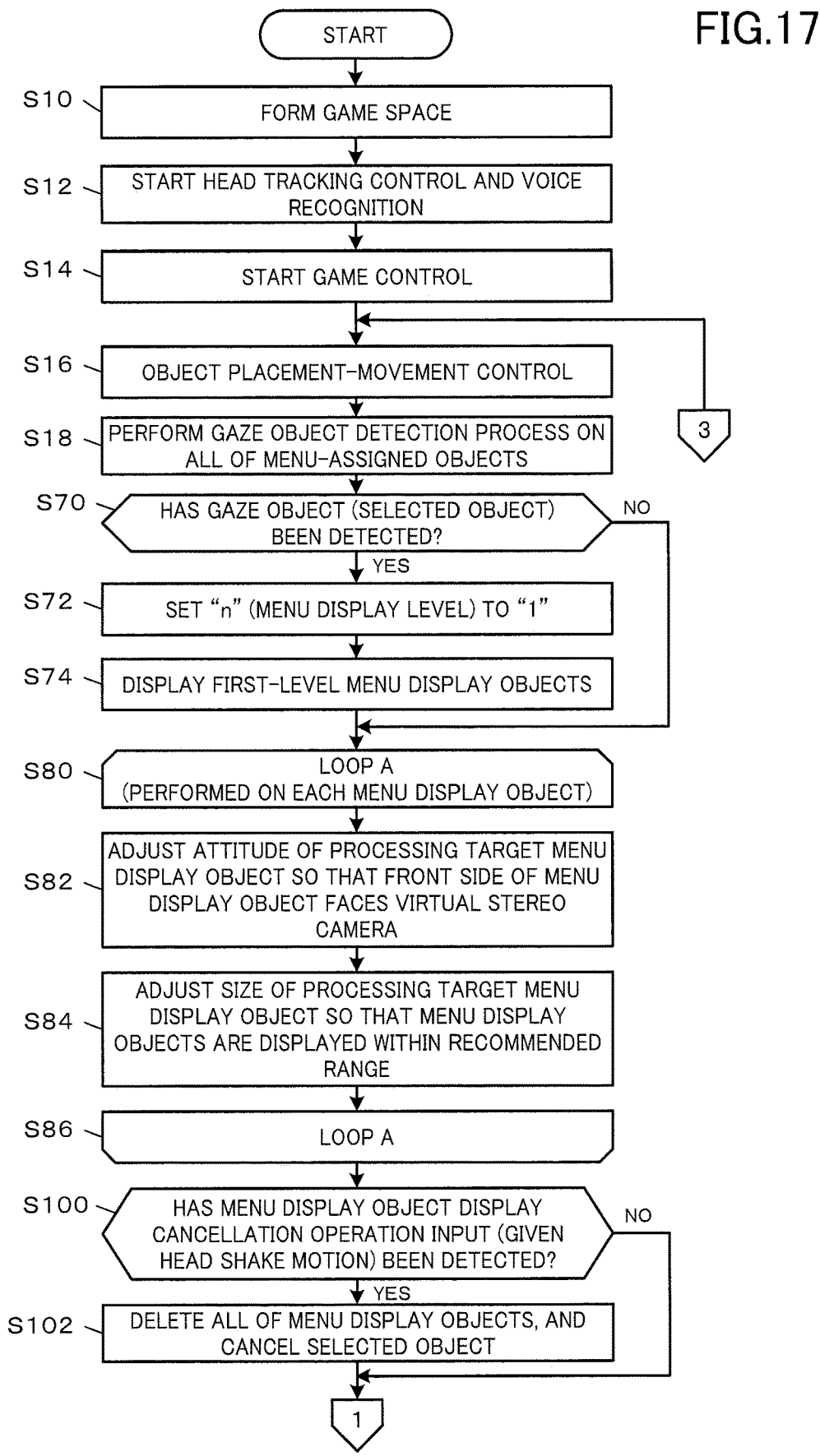
FIG. 17 is a flowchart illustrating the flow of a menu selection process that is performed by a game device utilizing head tracking.
Figure 18:
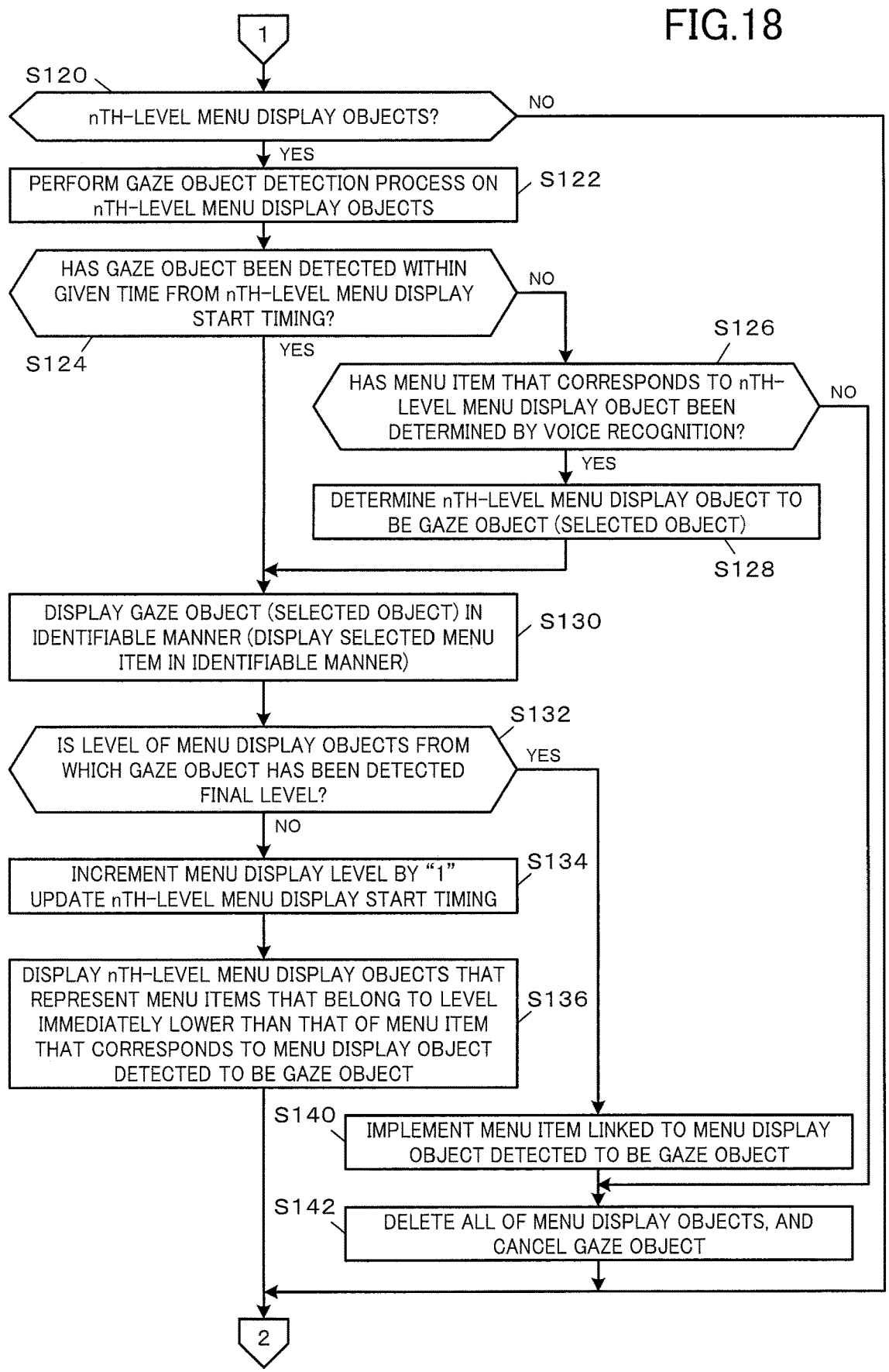
FIG. 18 is a flowchart that follows the flowchart illustrated in FIG. 17.
Figure 19:
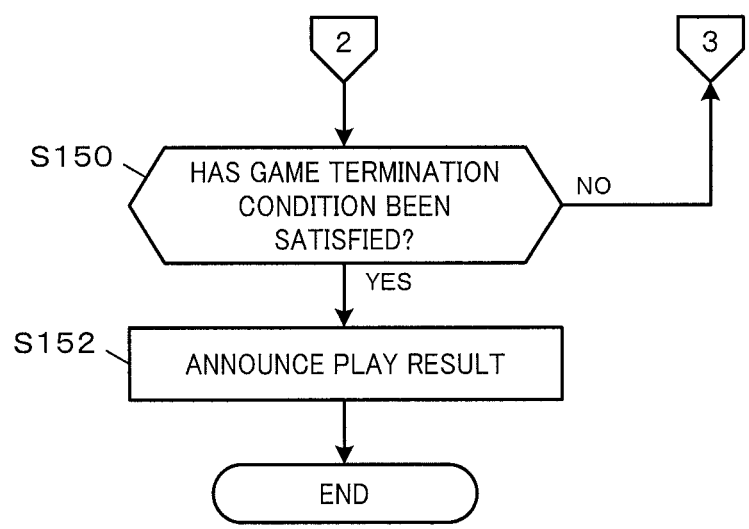
FIG. 19 is a flowchart that follows the flowchart illustrated in FIG. 18.

FIGS. 17 to 19 are flowcharts illustrating the flow of the menu selection process that is performed by the game device 1000 utilizing head tracking. The game device 1000 implements the menu selection process by executing the game program 505. Note that the game device main body 1002 has been connected to the touch panel 1004, the range sensor unit 1100, the game controller 1200, and the headset 1300 after completion of an authentication process. In one embodiment of the invention, the desired menu item can also be selected using the game controller 1200. Note that description thereof is omitted in the flowcharts.

The game device 1000 places an object that forms the background, an object that is operated by the player, the virtual stereo camera 10, and the like in the three-dimensional virtual space to form a game space (step S10), and starts the head tracking control process (step S12). The game device 1000 then starts the game control process (step S14).

The game device 1000 repeatedly performs steps S16 to S150 (see FIG. 18) during the game control process in a given control cycle.

More specifically, the game device 1000 performs an object placement-movement control process (step S16). The game device 1000 then performs a gaze object detection process on all of the menu-assigned objects among the objects that are placed in the game space (step S18).

Figure 20:
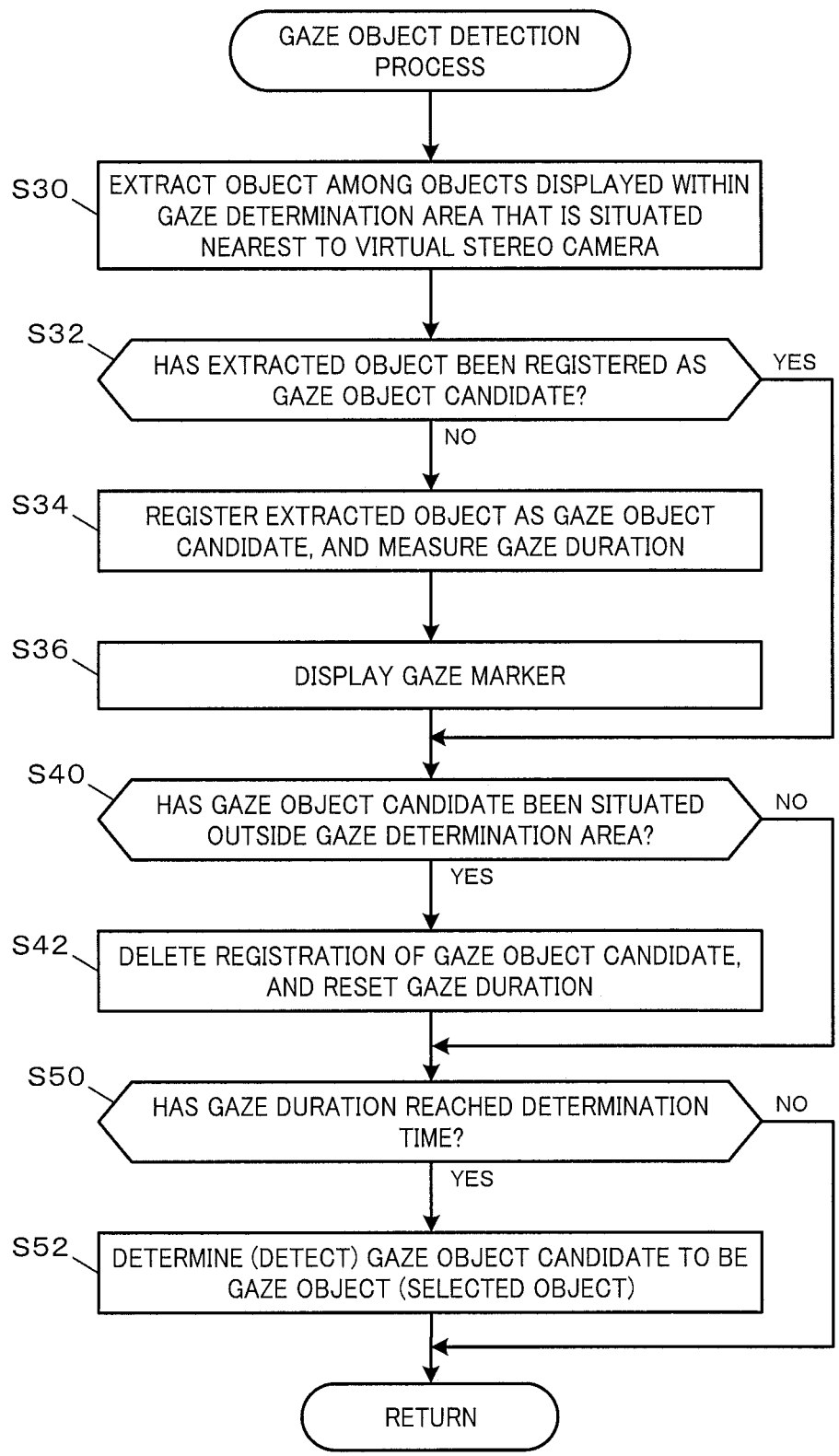
FIG. 20 is a flowchart illustrating the flow of a gaze object detection process.

FIG. 20 is a flowchart illustrating the flow of the gaze object detection process according to one embodiment of the invention. The game device 1000 extracts an object among the objects displayed within the gaze determination area 30 that is situated nearest to the virtual stereo camera 10 (step S30). Specifically, the game device 1000 extracts an object that is situated to intersect the line-of-sight direction of the virtual stereo camera 10.

When the extracted object has not been registered as the gaze object candidate (step S32), the game device 1000 sets (registers) the identification information about the object to the gaze object candidate ID 721, and measures the gaze duration 723 (step S34). The game device 1000 then displays the gaze marker 32 around the object (step S36 (see FIG. 6)).

When the object represented by the gaze object candidate ID 721 has been situated outside the gaze determination area 30 (YES in step S40), the game device 1000 resets the gaze object candidate ID 721 to "undetermined" (i.e., deletes the registration), and resets the gaze duration 723 to "0" (step S42).

When the gaze duration 723 has reached a given determination time (YES in step S50), the game device 1000 copies the identification information set to the gaze object candidate ID 721 to the selected object ID 725, and determines the object to be the gaze object. Specifically, the game device 1000 determines the object to be the selected object (step S52).

Again referring to FIG. 17, when the gaze object (selected object) has been detected from the menu-assigned objects as a result of the gaze object detection process (YES in step S70), the game device 1000 sets the variable "n" that represents the menu display level 740 to "1" (step S72), displays the first-level menu display objects 41, and copies the current date/time 900 to the nth-level menu display start timing 742 (step S74 (see FIG. 8)).

The game device 1000 performs a loop A process on each menu display object that has been placed in the game space (steps S80 to S86). Specifically, the game device 1000 adjusts the attitude of the processing target menu display object so that the front side of the menu display object faces the virtual stereo camera 10 (step S82), and adjusts the size of the menu display object so that the nth-level menu display objects are displayed within the recommended range 33 (step S84 (see FIG. 11)).

When a given menu display object display cancellation operation input has been detected after the game process has started (YES in step S100), the game device 1000 deletes all of the menu display objects placed in the game space, and resets the selected object ID 725 to "undetermined" (step S102). Note that it is preferable to delete the menu display objects so that the menu display objects gradually disappear in order from the menu display objects that belong to the lower level since it is visually favorable as compared with the case of suddenly deleting all of the menu display objects. For example, the menu display objects may be deleted so that the menu display objects gradually become transparent, or gradually decrease in display size, or gradually disappear while being broken from the edge.

As illustrated in FIG. 18, when the menu display objects that belong to the level represented by the menu display level 740 (i.e., nth-level menu display objects) remain undeleted (YES in step S120), the game device 1000 performs the gaze object detection process on the nth-level menu display objects (step S122).

When a new gaze object (selected object) has been detected from the nth-level menu display objects within a given time from the nth-level menu display start timing 742 as a result of the step S122 (YES in step S124), the game device 1000 displays the new gaze object in an identifiable manner (step S130 (see FIG. 9 (see (2)))), and determines whether or not the level of the nth-level menu display objects from which the gaze object has been detected is the final level (lowest level) (step S132).

When the menu item determined by voice recognition corresponds to one of the nth-level menu display objects (YES in step S126), the game device 1000 determines the nth-level menu display object to be the gaze object (selected object) (step S128). The game device 1000 displays the gaze object in an identifiable manner (step S130), and determines whether or not the level of the nth-level menu display objects from which the gaze object has been detected is the final level (lowest level) (step S132).

When the level of the nth-level menu display objects from which the gaze object has been detected is not the final level (lowest level) (NO in step S132), the game device 1000 determines that the menu item that corresponds to the nth-level menu display object that has been detected to be the gaze object has been selected, changes the variable "n" to a value that corresponds to a lower level by incrementing the menu display level 740 by "1", and updates the nth-level menu display start timing 742 (step S134). The game device 1000 then displays the nth-level menu display objects that represent the menu items that belong to the level immediately lower than that of the menu item that corresponds to the menu display object detected to be the gaze object in the step S122 (step S136) (see FIGS. 9 and 10).

When the level of the menu item that is displayed by the nth-level menu display object that has been detected to be the gaze object is the final level (lowest level) (YES in step S132), the game device 1000 determines that the menu item linked to the menu display object that has been detected to be the gaze object has been selected, and implements the contents of the menu item (step S140). The game device 1000 then deletes all of the menu display objects (i.e., cancels the display of all of the menu display objects), and initializes the gaze object candidate ID 721, the gaze duration 723, and the selected object ID 725 (step S142).

When a new gaze object has not been detected from the nth-level menu display objects within a given time from the nth-level menu display start timing 742 (NO in step S124), it is considered that the player has suspended the menu selection operation. For example, the player 2 may have stopped selecting the desired menu item, and turned the line-of-sight direction. In this case, the game device 1000 deletes all of the menu display objects (i.e., cancels the display of all of the menu display objects), and initializes the gaze object candidate ID 721, the gaze duration 723, and the selected object ID 725 (step S142).

As illustrated in FIG. 19, the game device 1000 then determines whether or not the game termination condition has been satisfied. When the game termination condition has not been satisfied (NO in step S150), the step S16 is performed again. When the game termination condition has been satisfied (YES in step S150), the game device 1000 performs a play result announcement process (step S152), and terminates the process.

According to the embodiments of the invention, it is possible to provide novel menu operation technology that does not require manual operation when providing video contents (e.g., game) using a head tracking type VR-HMD, and provide an improved video experience through the addition of a near-futuristic operation feel to the overwhelming virtual reality implemented by the VR-HMD.

Specifically, when the player has captured the desired object at the center of the field of view, the menu items having a hierarchical structure are displayed around the object one after another. The menu items are displayed as if they were floating in front of the player, and necessarily improve the spatial stereoscopic effect and virtual reality.

The player can select the menu display object that corresponds to the desired menu item by slightly tuning the line of sight, and capturing the menu display object at the center of the field of view. Since the player can select the desired menu item without using the game controller 1200 by merely changing the line-of-sight direction, it is possible to provide a more attractive and near-futuristic video experience.

Modifications

The invention is not limited to the embodiments described above. Various modifications and variations may be made, such as appropriately providing an additional element, omitting some of the elements, or modifying (changing) some of the elements.

First Modification

The headset 1300 may be an eyeglass-type or goggle-type wearable computer that includes an attitude detection sensor, and also function as the game device main body 1002, for example.

The game device 1000 according to the embodiments of the invention is not limited to a stationary consumer game device as long as the game device 1000 is a computer provided with a VR-HMD. The game device 1000 may also be applied to an attraction device that utilizes a VR-HMD and is installed in an amusement park, a museum, and the like, an airplane/helicopter simulation device that utilizes a VR-HMD, a sport simulation device that allows the user who wears a VR-HMD to virtually experience a sport (e.g., swing a golf club in a studio), and the like.

Second Modification

Figure 21:
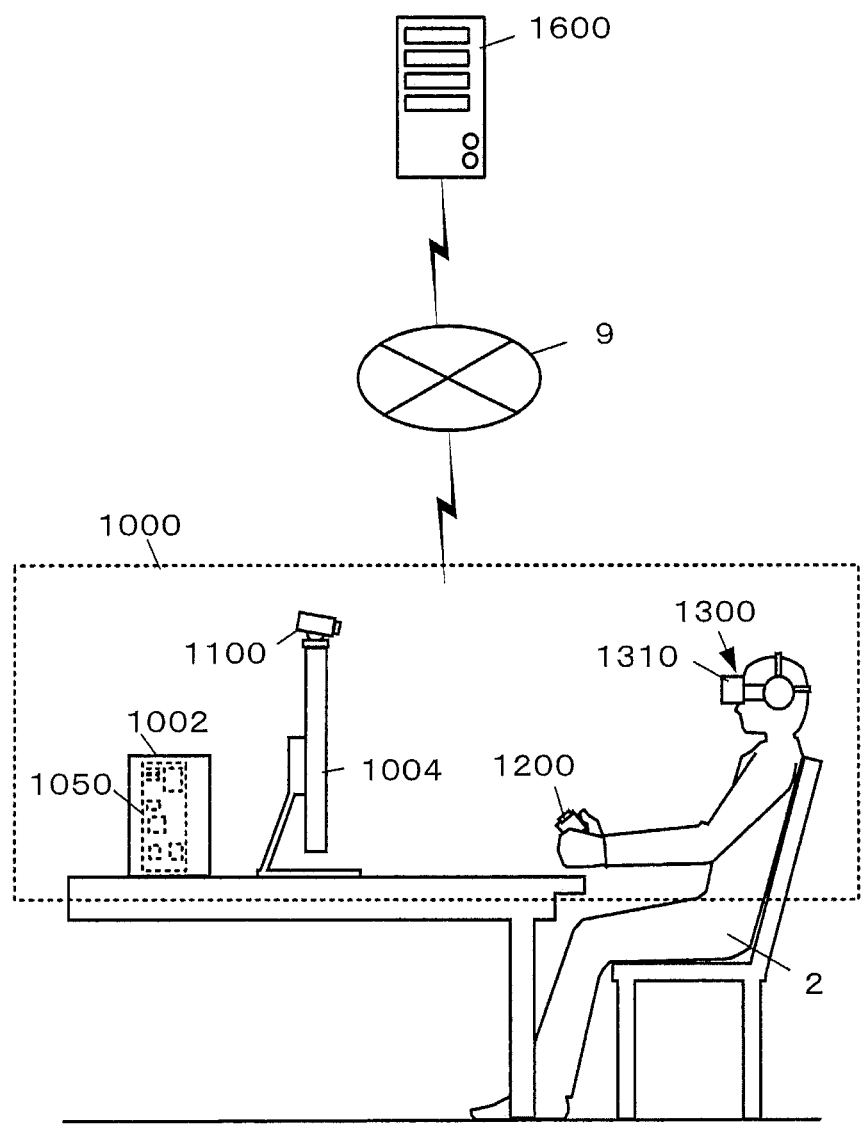
FIG. 21 is a view illustrating a configuration example of a game system that implements an online game.

Although the embodiments of the invention have been described above taking an example in which the game device 1000 is a stand-alone game device, the game device 1000 may be configured to implement an online game. In this case, the invention is applied to a game system in which a server system 1600 that functions as a game server, and the game device 1000 that functions as a player terminal, are connected through a communication line 9 so as to be able to communicate with each other (see FIG. 21). The game system may be designed so that the server system 1600 implements the functions of the processing section 200 and the storage section 500 (see FIG. 12), and implements the steps included in the flowcharts illustrated in FIGS. 16 to 18.

Third Modification

Although the embodiments of the invention have been described above taking an example in which the first-level menu display objects 41, the second-level menu display objects 42, and the third-level menu display objects 43 are respectively displayed along the rightward-leftward direction axis (Xc-axis), the upward-downward direction axis (Yc-axis), and the depth direction axis (Zc-axis) of the field-of-view coordinate system of the virtual stereo camera 10, the relationship between the level and the axis of the field-of-view coordinate system (along which the menu display objects are displayed), may be appropriately changed.

For example, the first-level menu display objects 41 may be displayed along the depth direction axis (Zc-axis), the second-level menu display objects 42 may be displayed along the upward-downward direction axis (Yc-axis), and the third-level menu display objects 43 may be displayed along the rightward-leftward direction axis (Xc-axis). When displaying fourth-level menu display objects, the fourth-level menu display objects are displayed along an axis other than the axis along which the third-level menu display objects 43 are displayed. The axis of the field-of-view coordinate system along which lower-level menu display objects may be appropriately set. The display directions of the information arrays that correspond to the respective levels need not necessarily be orthogonal to each other. It suffices that the display directions of the information arrays that correspond to the respective levels intersect each other, and the display directions of the information arrays that correspond to the nth level and the (n+1)th level differ from each other.

Fourth Modification

Figure 22:
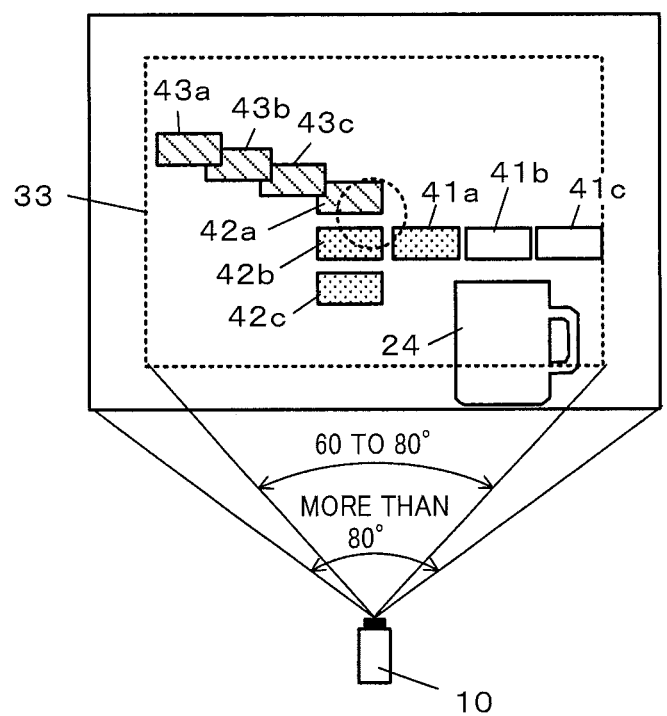
FIG. 22 is a view illustrating a modification of an adjustment of the display size of a menu display object.

Although the embodiments of the invention have been described above taking an example in which the step S84 (see FIG. 17) adjusts the size of the menu display objects so that the nth-level menu display objects that correspond to the nth level represented by the menu display level 740 are displayed within the recommended range 33, the size of the menu display objects may be adjusted so that the first-level menu display objects 41, . . . , and the nth-level menu display objects that correspond to the nth level represented by the menu display level 740 are displayed within the recommended range 33 (see FIG. 22).

Fifth Modification

Figure 23A:
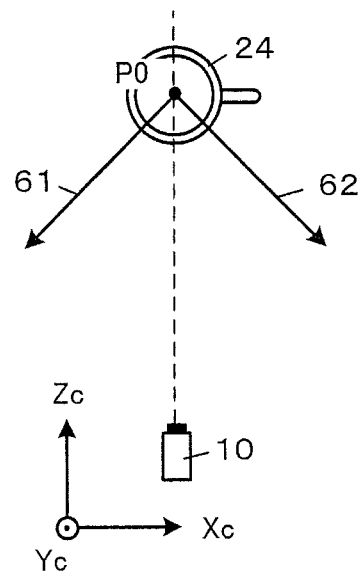
FIG. 23A is an overhead view illustrating a modification (1) with regard to menu display.
Figure 23B:
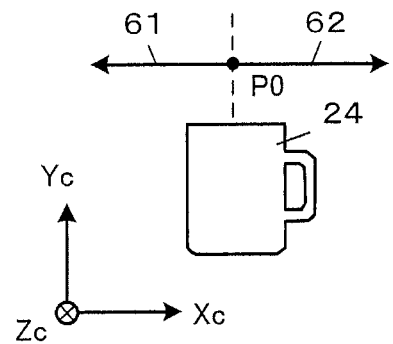
FIG. 23B is a side view illustrating a modification (1) with regard to menu display.

Although the embodiments of the invention have been described above taking an example in which 1) the reference direction 525 represents one direction that is set to the menu-assigned object, and 2) the reference direction 525 is set to be a direction that extends along one of the axes of the field-of-view coordinate system in which the line-of-sight direction of the virtual stereo camera 10 corresponds to the depth direction, another configuration may also be employed. FIG. 23A is an overhead view illustrating a modification (1) with regard to the menu display, and FIG. 23B is a side view illustrating the modification (1) with regard to the menu display. As illustrated in FIGS. 23A and 23B, a reference direction origin PO may be set at a position near the gaze object (cup object 24), and a plurality of reference directions (first reference direction 61 and second reference direction 62) may be set so as to be tilted with respect to the line-of-sight direction (depth direction) of the virtual stereo camera 10.

Figure 24A:
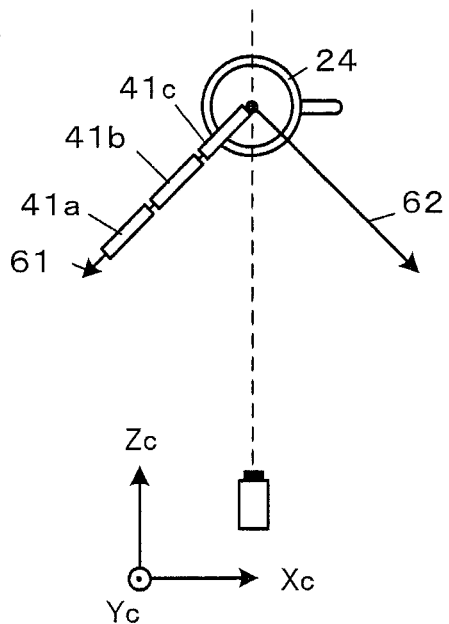
FIG. 24A is an overhead view illustrating a modification (2) with regard to menu display.
Figure 24B:
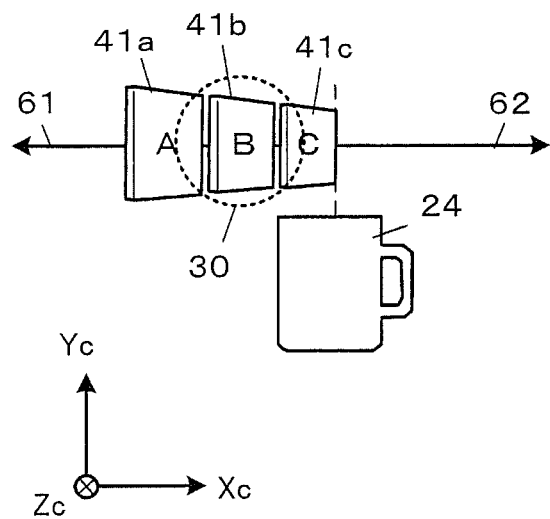
FIG. 24B is a side view illustrating a modification (2) with regard to menu display.
Figure 25A:
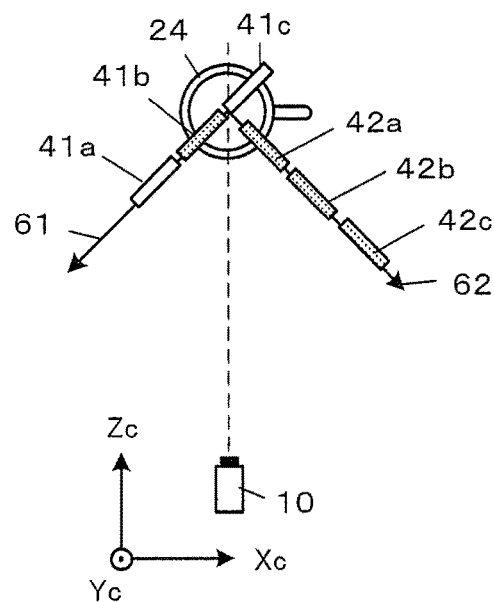
FIG. 25A is an overhead view illustrating a modification (3) with regard to menu display.

In this case, the plurality of reference directions may be used in rotation when determining the arrangement direction of the menu display objects to be displayed. For example, when the cup object 24 has been detected to be the gaze object in the state illustrated in FIGS. 23A and 23B, the first-level menu display objects 41 (41a, 41b, . . . ) are displayed along the first reference direction 61 (see FIGS. 24A and 24B). FIG. 24A is an overhead view illustrating a modification (2) with regard to the menu display, and FIG. 24B is a side view illustrating the modification (2) with regard to the menu display. When one of the first-level menu display objects 41 has been detected to be the gaze object (i.e., the first-level menu item has been selected), the second-level menu display objects 42 (42a, 42b, . . . ) that are linked to the second-level menu items are displayed along the second reference direction 62 (see FIGS. 25A and 25B). As illustrated in FIG. 25C, the first-level menu display object 41 that has not been selected may be deleted. FIG. 25A is an overhead view illustrating a modification (3) with regard to the menu display, FIG. 25B is a side view illustrating the modification (3) with regard to the menu display, and FIG. 25C is a side view illustrating another example of the modification (3) with regard to the menu display.

Figure 25B:
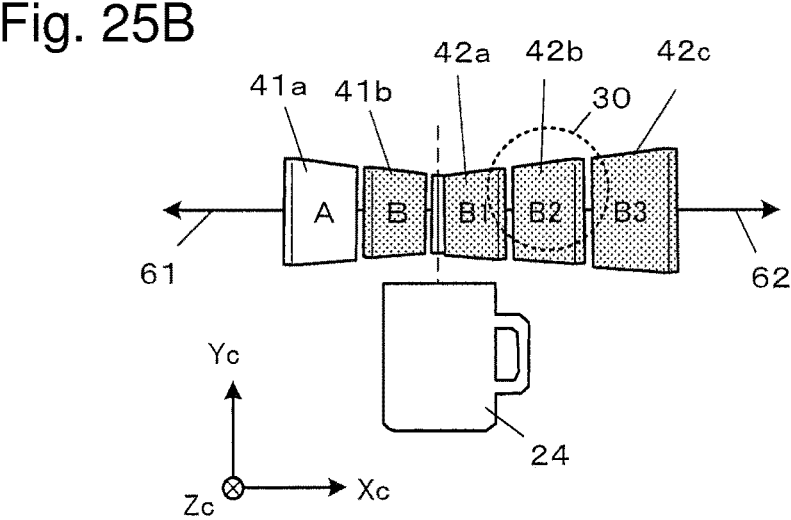
FIG. 25B is a side view illustrating a modification (3) with regard to menu display.
Figure 25C:
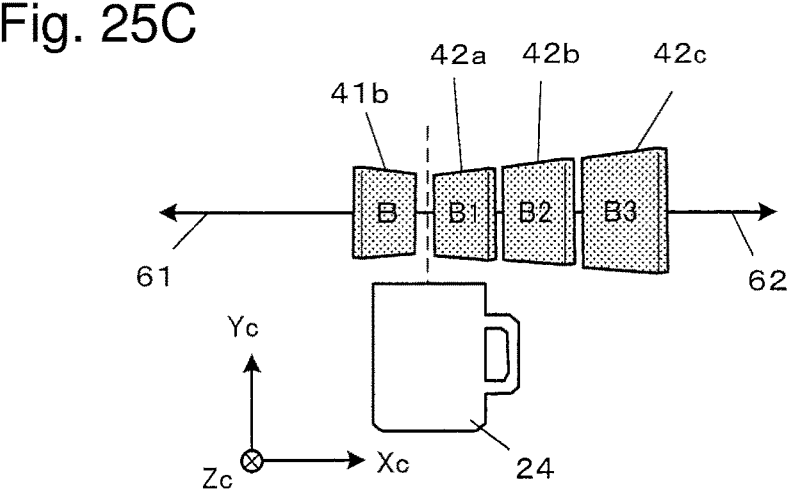
FIG. 25C is a side view illustrating another example of a modification (3) with regard to menu display.
Figure 26A:
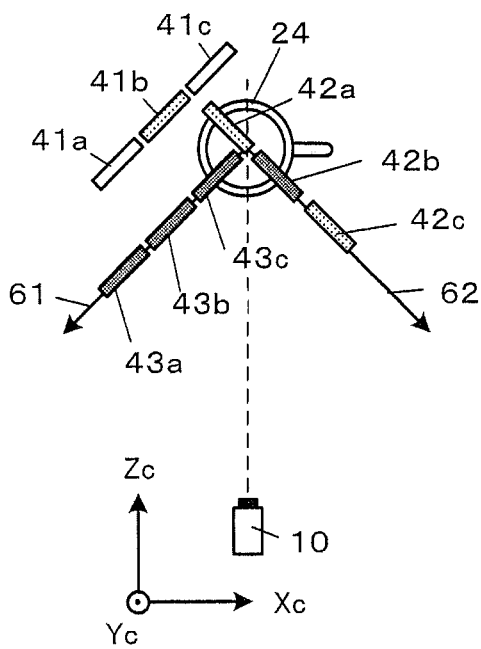
FIG. 26A is an overhead view illustrating a modification (4) with regard to menu display.
Figure 26B:
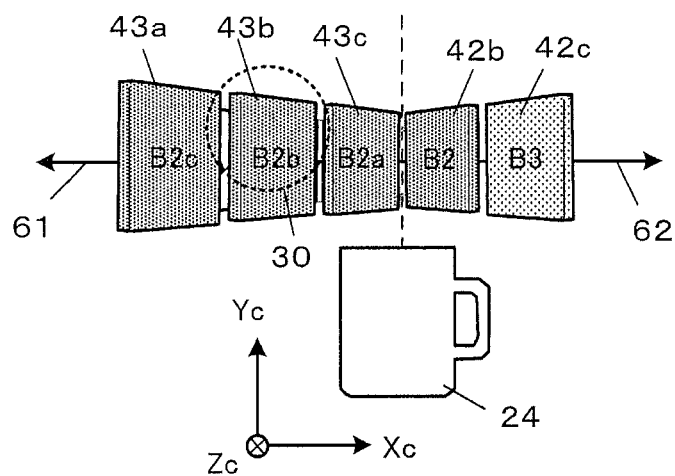
FIG. 26B is a side view illustrating a modification (4) with regard to menu display.
Figure 26C:
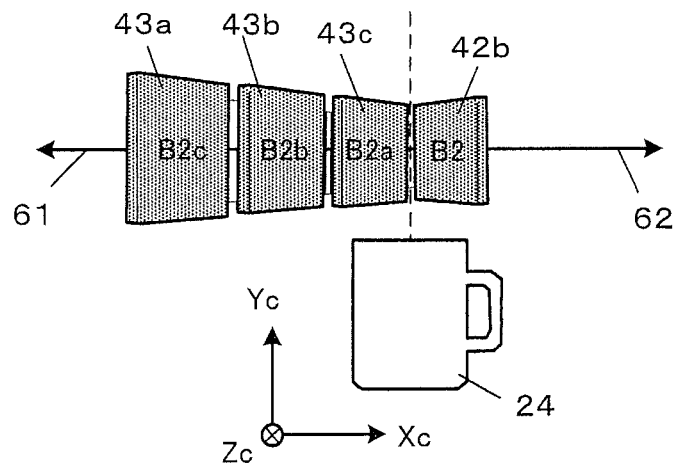
FIG. 26C is a side view illustrating another example of a modification (4) with regard to menu display.

When one of the second-level menu display objects 42 has been detected to be the gaze object (i.e., the second-level menu item has been selected) in the state illustrated in FIGS. 25A to 25C, the third-level menu display objects 43 (43a, 43b, 43c . . . ) that are linked to the third-level menu items are displayed along the first reference direction 61 (see FIGS. 26A and 26B). As illustrated in FIG. 24C, the second-level menu display object 42 that has not been selected may be deleted. The plurality of reference directions are thus used in rotation when determining the arrangement direction of the menu display objects to be displayed until the menu item that corresponds to the final level is selected. FIG. 26A is an overhead view illustrating a modification (4) with regard to the menu display, FIG. 26B is a side view illustrating the modification (4) with regard to the menu display, and FIG. 26C is a side view illustrating another example of the modification (4) with regard to the menu display.

Sixth Modification

The relative positional relationship between the menu display objects that have been placed in the game space and the selected menu-assigned object may be appropriately changed corresponding to the progress of the menu display control process.

For example, when displaying the (n+1)th-level menu display objects, the placement position of the object (e.g., the first-level menu display object 41b (see FIG. 24)) among the nth-level menu display objects that has been detected to be the gaze object may be changed (shifted) to the vicinity of the reference direction origin PO along the reference direction, and the (n+1)th-level menu display objects may be displayed along the other reference direction (see FIGS. 24A to 26C).

In this case, the nth-level menu display objects that have been displayed are shifted along the reference direction applied to the nth-level menu display objects. The (n+1)th-level menu display objects that are to be selected by the player are placed along the first reference direction 61 or the second reference direction 62 so as to be situated close to the cup object 24. According to this configuration, the player can quickly perform a menu selection operation without considerably moving his/her head during the gaze operation when selecting the desired menu-assigned object (cup object 24), and selecting the desired menu item.

Seventh Modification

Figure 27A:
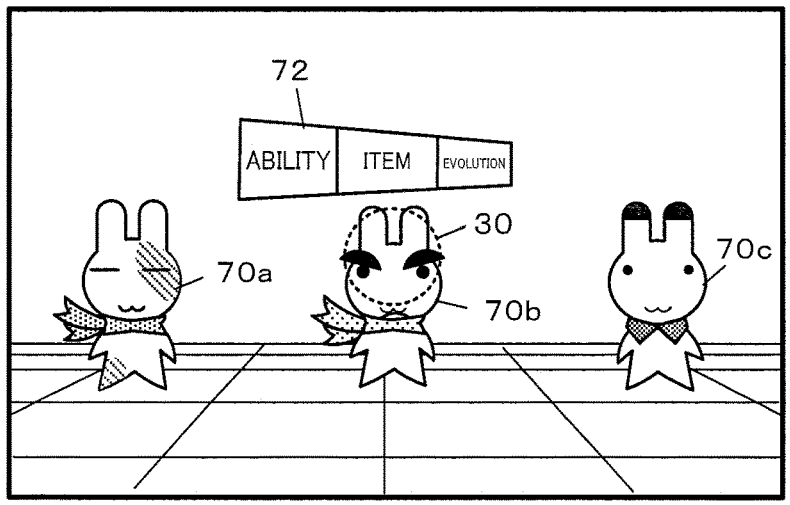
FIGS. 27A to 27C are views illustrating an example of information display.
Figure 27B:
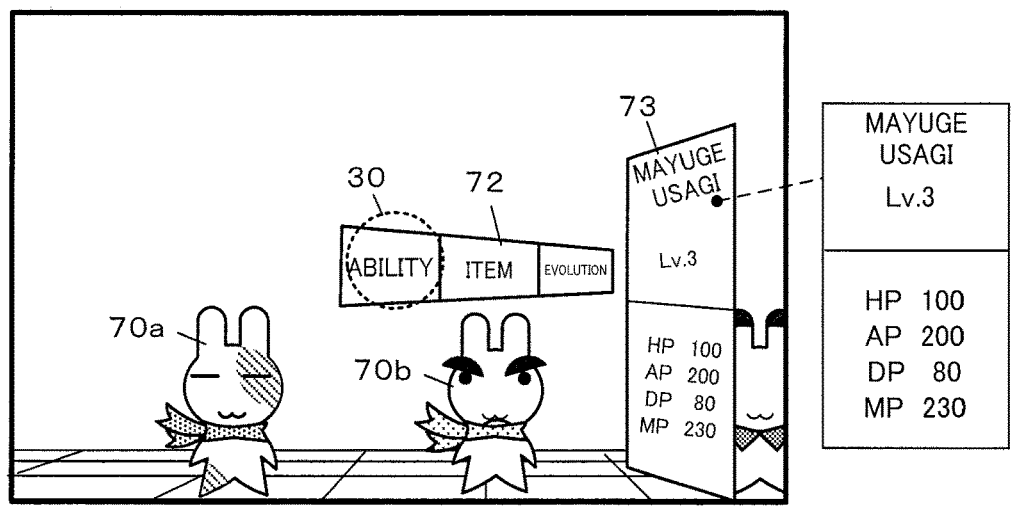
Figure 27C:
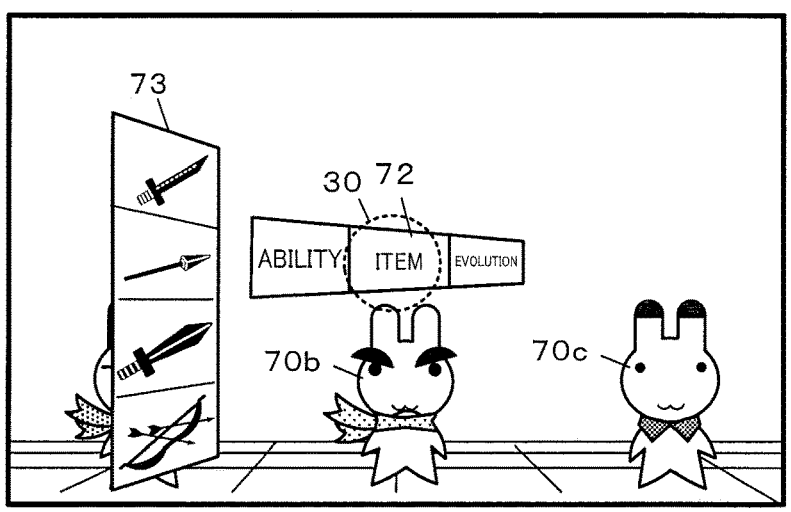

Although the embodiments of the invention have been described above taking a video game as an example of the video contents, the video contents are not limited to a video game. The invention may also be applied to a case where information about an object is displayed instead of a menu (menu item) depending on the details of the video contents. As illustrated in FIGS. 27A to 27C, the video contents may be a picture book that utilizes virtual reality, an information category display object 72 (corresponding to the first-level menu display object 41 (see above)) may be displayed when one of recorded objects 70 (70a, 70b, 70c . . . ) that are recorded on the picture book has been selected to be the gaze object, and a detail display object 73 (73a, 73b. 73c) (corresponding to the second-level menu display object 42 (see above)) that displays the details of the selected information category may be displayed.

Eighth Modification

Although the embodiments of the invention have been described above taking an example in which the menu display objects are placed using the line-of-sight direction of the virtual stereo camera 10 as a reference, the menu display objects may be displayed taking account of the position of the selected object in addition to the line-of-sight direction of the virtual stereo camera 10.

Figure 28:
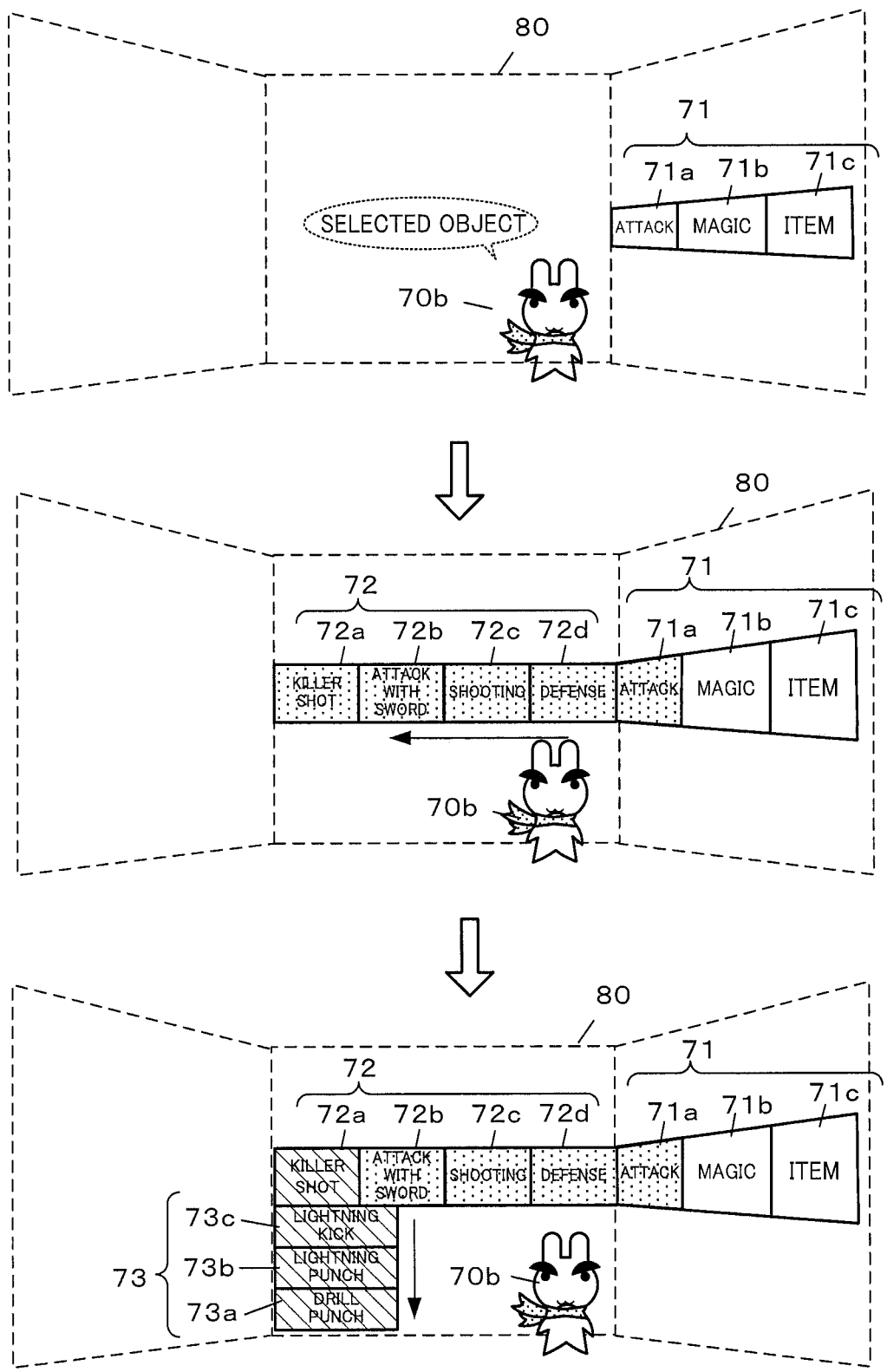
FIG. 28 is a view illustrating a modification of menu display.

As illustrated in FIG. 28, the (n+1)th-level menu display objects may be placed (displayed) so as to be linked (connected) to the selected nth-level menu display object (i.e., first-level menu display object 71 (71a, 71b, 71c) or second-level menu display object 72 (72a, 72b, 72c, 72d) in FIG. 28), for example. In this case, the (n+1)th-level menu display objects may be placed (displayed) along a virtual screen 80 (that cannot be observed by the player, and is provided corresponding to each selected object) that is three-dimensionally placed in the line of sight direction (depth direction) of the virtual stereo camera 10 with respect to the position of the selected object 70b.

Ninth Modification

Although the embodiments of the invention have been described above taking an example in which a stereoscopic image is displayed on the VR-HMD 1310, a two-dimensional image (planar image) may be displayed on the VR-HMD 1310. In this case, one virtual camera may be provided at an intermediate (middle) position between the right virtual camera and the left virtual camera included in the virtual stereo camera 10, and may be used instead of the virtual stereo camera 10. Alternatively, only one of the right virtual camera and the left virtual camera may be used.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A method comprising:
setting, by a computer, a game space by placing a plurality of objects that form a game world;
placing, by the computer, a virtual stereo camera in the game space to generate a stereoscopic image, the virtual stereo camera including a right virtual camera and a left virtual camera;
causing, by the computer, a display of a head tracking type and non-see-through type virtual reality head mounted display (VR-HMD) to display the stereoscopic image generated based on the virtual stereo camera, the stereoscopic image including a right-eye image captured by the right virtual camera and a left-eye image captured by the left virtual camera;
determining, by the computer, a front direction of the VR-HMD in the displayed game space;
determining, by the computer, an object among the plurality of objects that is situated to intersect the front direction to be a selected object;
determining, by the computer, an information array corresponding to the selected object from among one or more information arrays;
causing, by the computer, the display of the VR-HMD to place the determined information array in the displayed game space; and
causing, by the computer, the display to change a size of the displayed information array to correspond to a distance from a viewpoint position of the VR-HMD to the selected object in the game space.

2. The method as defined in claim 1, further comprising:
causing, by the computer, the display to change the size of the displayed information array so that the information array is situated within a range defined by a given angle that falls within a horizontal angle of view of 60 to 80° with respect to the line-of-sight direction when the size of the displayed information array in a rightward-leftward direction exceeds the range defined by the given angle.

3. A method comprising:
setting, by a computer, a virtual game by placing a plurality of objects that form a game world;
placing, by the computer, a virtual stereo camera in the game space to generate a stereoscopic image, the virtual stereo camera including a right virtual camera and a left virtual camera;
causing, by the computer, a display of a head tracking type and non-see-through type virtual reality head mounted display (VR-HMD) to display the stereoscopic image generated based on the virtual stereo camera, the stereoscopic image including a right-eye image captured by the right virtual camera and a left-eye image captured by the left virtual camera;
determining, by the computer, a front direction of the VR-HMD in the displayed virtual game space;
determining, by the computer, an object among the plurality of objects that is situated to intersect the front direction to be a selected object;
determining, by the computer, an information array corresponding to the selected object from among one or more information arrays; and
causing, by the computer, the display of the VR-HMD to place the determined information array in the displayed game space, wherein:
a reference direction with respect to the determined information array is linked to the selected object,
the information array has a hierarchical structure in which the information arrangement direction is defined on a level basis, and
the causing, by the computer, the display of the VR-HMD to place the determined information array in the displayed game space includes: causing, by the computer, the display of the VR-HMD to place the determined information array in the game space so that the information arrangement direction that corresponds to a first level coincides with the reference direction that is linked to the selected object.

4. A method comprising:
setting, by a computer, a game space by placing a plurality of objects that form a game world;
placing, by the computer, a virtual stereo camera in the game space to generate a stereoscopic image, the virtual stereo camera including a right virtual camera and a left virtual camera;
causing, by the computer, a display of a head tracking type and non-see-through type virtual reality head mounted display (VR-HMD) to display the stereoscopic image generated based on the virtual stereo camera, the stereoscopic image including a right-eye image captured by the right virtual camera and a left-eye image captured by the left virtual camera;
determining, by the computer, a front direction of the VR-HMD in the displayed game space relative to a selected object of the plurality of objects;
determining, by the computer, an information array of one or more information arrays based on the front direction of the VR-HMD in the displayed game space;
causing, by the computer, the display of the VR-HMD to place the determined information array in the game space in a relative and three-dimensional manner with respect to the selected object, wherein
a reference direction with respect to the determined information array is linked to the selected object, and
the information array has a hierarchical structure in which the information arrangement direction is defined on a level basis; and
causing, by the computer, the display of the VR-HMD to place the determined information array in the game space so that the information arrangement direction that corresponds to a first level coincides with the reference direction that is linked to the selected object.

5. A method comprising:
setting, by a computer, a game space by placing a plurality of objects that form a game world;
placing, by the computer, a virtual stereo camera in the game space to generate a stereoscopic image, the virtual stereo camera including a right virtual camera and a left virtual camera;
causing, by the computer, a display of a head tracking type and non-see-through type virtual reality head mounted display (VR-HMD) to display the stereoscopic image generated based on the virtual stereo camera, the stereoscopic image including a right-eye image captured by the right virtual camera and a left-eye image captured by the left virtual camera;
determining, by the computer, a front direction of the VR-HMD in the game space relative to a selected object of the plurality of objects;
determining, by the computer, a plurality of objects based on the determined front direction;
recognizing, by the computer, a voice input through a microphone;
determining, by the computer, an object among the plurality of objects to be a selected object based on a result of the recognition of the voice input;
determining, by the computer, an information array of one or more information arrays corresponding to the selected object; and
causing, by the computer, the display of the VR-HMD to place the determined information array in the game space in a relative and three-dimensional manner with respect to the selected object, wherein:
a reference direction with respect to the determined information array is linked to the selected object,
the information array has a hierarchical structure in which the information arrangement direction is defined on a level basis, and the causing, by the computer, the display of the VR-HMD to place the determined information array in the game space includes: causing, by the computer, the display of the VR-HMD to place the determined information array in the game space so that the information arrangement direction that corresponds to a first level coincides with the reference direction that is linked to the selected object.

6. A method comprising:

setting, by a computer, a game space by placing a plurality of objects that form a game world;

placing, by the computer, a virtual stereo camera in the game space to generate a stereoscopic image, the virtual stereo camera including a right virtual camera and a left virtual camera;

causing, by the computer, a display of a head tracking type and non-see-through type virtual reality head mounted display (VR-HMD) to display the stereoscopic image generated based on the virtual stereo camera, the stereoscopic image including a right-eye image captured by the right virtual camera and a left-eye image captured by the left virtual camera;

determining, by the computer, a front direction of the VR-HMD in the displayed game space relative to a selected object of the plurality of objects;

determining, by the computer, an object among the plurality of objects that is situated to intersect the front direction to be a selected object;

determining, by the computer, an information array corresponding to the selected object from among one or more information arrays; and causing, by the computer, the display of the VR-HMD to place the determined information array in the displayed game space, wherein the determined information array is an array of items having a hierarchical structure, and has a configuration in which the information arrangement direction is defined on a level basis;

selecting, by the computer, an item from a plurality of items displayed as the determined information array in a hierarchical order; and causing, by the computer, the display of the VR-HMD to arrange corresponding items in a corresponding information arrangement direction in a hierarchical order based on the selected item.

7. The method as defined in claim 6, further comprising: causing, by the computer, the display of the VR-HMD to arrange items that correspond to a higher level and items that correspond to a lower level with respect to the level of the selected item in directions that intersect each other.

8. A method comprising:

setting, by a computer, a game space by placing a plurality of objects that form a game world;

placing, by the computer, a virtual stereo camera in the game space to generate a stereoscopic image, the virtual stereo camera including a right virtual camera and a left virtual camera;

causing, by the computer, a display of a head tracking type and non-see-through type virtual reality head mounted display (VR-HMD) to display the stereoscopic image generated based on the virtual stereo camera, the stereoscopic image including a right-eye image captured by the right virtual camera and a left-eye image captured by the left virtual camera;

determining, by the computer, a front direction of the VR-HMD in the displayed game space relative to a selected object of the plurality of objects;

determining, by the computer, an information array of one or more information arrays based on the front direction of the VR-HMD in the displayed game space;

causing, by the computer, the display of the VR-HMD to place the determined information array in the game space in a relative and three-dimensional manner with respect to the selected object, wherein the determined information array is an array of items having a hierarchical structure, and has a configuration in which the information arrangement direction is defined on a level basis;

selecting, by the computer, an item from a plurality of items displayed as the determined information array in a hierarchical order; and causing, by the computer, the display of the VR-HMD to arrange corresponding items in a corresponding information arrangement direction in a hierarchical order based on the selected item.

9. A method comprising:

setting, by a computer, a game space by placing a plurality of objects that form a game world;

placing, by the computer, a virtual stereo camera in the game space to generate a stereoscopic image, the virtual stereo camera including a right virtual camera and a left virtual camera;

causing, by the computer, a display of a head tracking type and non-see-through type virtual reality head mounted display (VR-HMD) to display the stereoscopic image generated based on the virtual stereo camera, the stereoscopic image including a right-eye image captured by the right virtual camera and a left-eye image captured by the left virtual camera;

determining, by the computer, a front direction of the VR-HMD in the game space relative to a selected object of the plurality of objects;

determining, by the computer, a plurality of objects based on the determined front direction;

recognizing, by the computer, a voice input through a microphone;

determining, by the computer, an object among the plurality of objects to be a selected object based on a result of the recognition of the voice input;

determining, by the computer, an information array of one or more information arrays corresponding to the selected object; and causing, by the computer, the display of the VR-HMD to place the determined information array in the game space in a relative and three-dimensional manner with respect to the selected object, and the information arrangement direction having a given relative relationship with respect to the determined front direction, wherein the determined information array is an array of items having a hierarchical structure, and has a configuration in which the information arrangement direction is defined on a level basis;

selecting, by the computer, an item from a plurality of items displayed as the determined information array in a hierarchical order; and causing, by the computer, the display of the VR-HMD to arrange corresponding items in a corresponding information arrangement direction in a hierarchical order based on the selected item.

10. A method comprising:

setting, by a computer, a game space by placing a plurality of objects that form a game world;

placing, by the computer, a virtual stereo camera in the game space to generate a stereoscopic image, the virtual stereo camera including a right virtual camera and a left virtual camera;
causing, by the computer, a display of a head tracking type and non-see-through type virtual reality head mounted display (VR-HMD) to display the stereoscopic image generated based on the virtual stereo camera, the stereoscopic image including a right-eye image captured by the right virtual camera and a left-eye image captured by the left virtual camera;
determining, by the computer, a front direction of the VR-HMD in the displayed game space relative to a selected object of the plurality of objects;
determining, by the computer, an object among the plurality of objects that is situated to intersect the front direction to be a selected object;
determining, by the computer, an information array corresponding to the selected object from among one or more information arrays;
causing, by the computer, the display of the VR-HMD to place the determined information array in the displayed game space;
detecting, by the computer, a head shake of a user from a motion of the VR-HMD; and
causing, by the computer, the display of the VR-HMD to stop displaying the information array when the head shake has been detected.

11. A method comprising:
setting, by a computer, a game space by placing a plurality of objects that form a game world;
placing, by the computer, a virtual stereo camera in the game space to generate a stereoscopic image, the virtual stereo camera including a right virtual camera and a left virtual camera;
causing, by the computer, a display of a head tracking type and non-see-through type virtual reality head mounted display (VR-HMD) to display the stereoscopic image generated based on the virtual stereo camera, the stereoscopic image including a right-eye image captured by the right virtual camera and a left-eye image captured by the left virtual camera;
determining, by the computer, a front direction of the VR-HMD in the displayed game space relative to a selected object of the plurality of objects;
determining, by the computer, an information array of one or more information arrays based on the front direction of the VR-HMD in the displayed game space;
causing, by the computer, the display of the VR-HMD to place the determined information array in the game space in a relative and three-dimensional manner with respect to the selected object;
detecting, by the computer, a head shake of a user from a motion of the VR-HMD; and
causing, by the computer, the display of the VR-HMD to stop displaying the information array when the head shake has been detected.

12. A method comprising:
setting, by a computer, a game space by placing a plurality of objects that form a game world;
placing, by the computer, a virtual stereo camera in the game space to generate a stereoscopic image, the virtual stereo camera including a right virtual camera and a left virtual camera;
causing, by the computer, a display of a head tracking type and non-see-through type virtual reality head mounted display (VR-HMD) to display the stereoscopic image generated based on the virtual stereo camera, the stereoscopic image including a right-eye image captured by the right virtual camera and a left-eye image captured by the left virtual camera;
determining, by the computer, a front direction of the VR-HMD in the game space relative to a selected object of the plurality of objects;
determining, by the computer, a plurality of objects based on the determined front direction;
recognizing, by the computer, a voice input through a microphone;
determining, by the computer, an object among the plurality of objects to be a selected object based on a result of the recognition of the voice input;
determining, by the computer, an information array of one or more information arrays corresponding to the selected object;
causing, by the computer, the display of the VR-HMD to place the determined information array in the game space in a relative and three-dimensional manner with respect to the selected object, and the information arrangement direction having a given relative relationship with respect to the determined front direction;
detecting, by the computer, a head shake of a user from a motion of the VR-HMD; and
causing, by the computer, the display of the VR-HMD to stop displaying the information array when the head shake has been detected.

13. An image generation device comprising:
a processor programmed to:
set a game space by placing a plurality of objects that form a game world;
place, by the computer, a virtual stereo camera in the game space to generate a stereoscopic image, the virtual stereo camera including a right virtual camera and a left virtual camera;
cause a display of a head tracking type and non-see-through type virtual reality head mounted display (VR-HMD) to display the stereoscopic image generated based on the virtual stereo camera, the stereoscopic image including a right-eye image captured by the right virtual camera and a left-eye image captured by the left virtual camera;
determine a front direction of the VR-HMD in the displayed game space relative to a selected object of the plurality of objects;
determine an object among the plurality of objects that is situated to intersect the front direction to be a selected object;
determine an information array corresponding to the selected object from among one or more information arrays;
cause the display of the VR-HMD to place the determined information array in the displayed game space; and
cause the display to change a size of the displayed information array to correspond to a distance from a viewpoint position of the VR-HMD to the selected object in the game space.

14. An image generation device comprising:
a processor programmed to:
set a game space by placing a plurality of objects that form a game world;
place, by the computer, a virtual stereo camera in the game space to generate a stereoscopic image, the virtual stereo camera including a right virtual camera and a left virtual camera;

cause a display of a head tracking type and non-see-through type virtual reality head mounted display (VR-HMD) to display the stereoscopic image generated based on the virtual stereo camera, the stereoscopic image including a right-eye image captured by the right virtual camera and a left-eye image captured by the left virtual camera;

determine a front direction of the VR-HMD in the displayed game space relative to a selected object of the plurality of objects;

determine an information array of one or more information arrays based on the front direction of the VR-HMD in the displayed game space;

cause the display of the VR-HMD to place the determined information array in the game space in a relative and three-dimensional manner with respect to the selected object, wherein:

a reference direction with respect to the determined information array is linked to the selected object, the information array has a hierarchical structure in which the information arrangement direction is defined on a level basis, and the causing, by the computer, the display of the VR-HMD to place the determined information array in the displayed game space includes causing, by the computer, the display of the VR-HMD to place the determined information array in the game space so that the information arrangement direction that corresponds to a first level coincides with the reference direction that is linked to the selected object.

15. An image generation device comprising:
a processor programmed to:
set a game space by placing a plurality of objects that form a game world;
place, by the computer, a virtual stereo camera in the game space to generate a stereoscopic image, the virtual stereo camera including a right virtual camera and a left virtual camera;
cause a display of a head tracking type and non-see-through type virtual reality head mounted display (VR-HMD) to display the stereoscopic image generated based on the virtual stereo camera, the stereoscopic image including a right-eye image captured by the right virtual camera and a left-eye image captured by the left virtual camera;
determine a front direction of the VR-HMD in the game space relative to a selected object of the plurality of objects;
determine an information array of one or more information arrays based on the front direction of the VR-HMD in the displayed game space; and
cause the display of the VR-HMD to place the determined information array in the game space in a relative and three-dimensional manner with respect to the selected object, wherein:
a reference direction with respect to the determined information array is linked to the selected object,
the information array has a hierarchical structure in which the information arrangement direction is defined on a level basis, and
the processor is programmed to: cause the display of the VR-HMD to place the determined information array in the game space so that the information arrangement direction that corresponds to a first level coincides with the reference direction that is linked to the selected object.

16. A method comprising:
setting, by a computer, a game space by placing a plurality of objects that form a game world;
placing, by the computer, a virtual stereo camera in the game space to generate a stereoscopic image, the virtual stereo camera including a right virtual camera and a left virtual camera;
causing, by the computer, a display of a head tracking type and non-see-through type virtual reality head mounted display (VR-HMD) to display the stereoscopic image generated based on the virtual stereo camera, the stereoscopic image including a right-eye image captured by the right virtual camera and a left-eye image captured by the left virtual camera;
determining, by the computer, a front direction of the VR-HMD in the displayed game space relative to a selected object of the plurality of objects;
determining, by the computer, an information array of one or more information arrays based on the front direction of the VR-HMD in the displayed game space; and
causing, by the computer, the display of the VR-HMD to place the determined information array in the game space in a relative and three-dimensional manner with respect to the selected object, wherein
the causing the display to place the predetermined information array in the game space so as to satisfy the given placement condition includes causing, by the computer, a size of the information array to be changed so that the information array is situated within a given effective field of view with respect to the front direction when the size of the information array exceeds the given effective field of view.

17. A method comprising:
setting, by a computer, a game space by placing a plurality of objects that form a game world;
placing, by the computer, a virtual stereo camera in the game space to generate a stereoscopic image, the virtual stereo camera including a right virtual camera and a left virtual camera;
causing, by the computer, a display of a head tracking type and non-see-through type virtual reality head mounted display (VR-HMD) to display the stereoscopic image generated based on the virtual stereo camera, the stereoscopic image including a right-eye image captured by the right virtual camera and a left-eye image captured by the left virtual camera;
determining, by the computer, a front direction of the VR-HMD in the displayed game space relative to a selected object of the plurality of objects;
determining, by the computer, an object among the plurality of objects that is situated to intersect the front direction to be a selected object;
determining, by the computer, an information array corresponding to the selected object from among one or more information arrays; and
causing, by the computer, the display of the VR-HMD to place the determined information array in the displayed game space, wherein the one or more information arrays includes two or more information arrays.

18. The method as defined in claim 17, further comprising: measuring, by the computer, a selection duration in which an identical object is selected, and when the selection duration reaches a given determination time, causing, by the computer, the display to display the determined information array.

19. The method as defined in claim 17, wherein a plurality of information arrangement directions being defined in a relative and three-dimensional manner with respect to the information array, and the information array being placed in the game space so that a position of the selected object serves as a base point, and the information arrangement direction has a given relative relationship with respect to the front direction.

20. The method as defined in claim 17, further comprising:
    determining, by the computer, whether an information array is assigned to the selected object; and
    in response to the information array being assigned to the selected object, determining that the assigned information array is the determined information array.

21. A method comprising:
    setting, by a computer, a game space by placing a plurality of objects that form a game world;
    placing, by the computer, a virtual stereo camera in the game space to generate a stereoscopic image, the virtual stereo camera including a right virtual camera and a left virtual camera;
    causing, by the computer, a display of a head tracking type and non-see-through type virtual reality head mounted display (VR-HMD) to display the stereoscopic image generated based on the virtual stereo camera, the stereoscopic image including a right-eye image captured by the right virtual camera and a left-eye image captured by the left virtual camera;
    determining, by the computer, a front direction of the VR-HMD in the displayed game space relative to a selected object of the plurality of objects;
    determining, by the computer, an information array of one or more information arrays based on the front direction of the VR-HMD in the displayed game space; and
    causing, by the computer, the display of the VR-HMD to place the determined information array in the game space in a relative and three-dimensional manner with respect to the selected object, wherein the one or more information arrays includes two or more information arrays.

22. The method as defined in claim 21, further comprising:
    determining, by the computer, an object among the plurality of objects to be a selected object; and
    causing the computer to place the determined information array in the game space so that a position of the selected object serves as a base point, and the information arrangement direction has a given relative relationship with respect to the determined front direction.

23. A method comprising:
    setting, by a computer, a game space by placing a plurality of objects that form a game world;
    placing, by the computer, a virtual stereo camera in the game space to generate a stereoscopic image, the virtual stereo camera including a right virtual camera and a left virtual camera;
    causing, by the computer, a display of a head tracking type and non-see-through type virtual reality head mounted display (VR-HMD) to display the stereoscopic image generated based on the virtual stereo camera, the stereoscopic image including a right-eye image captured by the right virtual camera and a left-eye image captured by the left virtual camera;
    determining, by the computer, a front direction of the VR-HMD in the game space relative to a selected object of the plurality of objects;
    determining, by the computer, a plurality of objects based on the determined front direction;
    recognizing, by the computer, a voice input through a microphone;
    determining, by the computer, an object among the plurality of objects to be a selected object based on a result of the recognition of the voice input;
    determining, by the computer, an information array of one or more information arrays corresponding to the selected object; and
    causing, by the computer, the display of the VR-HMD to place the determined information array in the game space in a relative and three-dimensional manner with respect to the selected object, and the information arrangement direction having a given relative relationship with respect to the determined front direction, wherein the one or more information arrays includes two or more information arrays.

24. An image generation device comprising:
    a processor programmed to:
    set a game space by placing a plurality of objects that form a game world;
    place, by the computer, a virtual stereo camera in the game space to generate a stereoscopic image, the virtual stereo camera including a right virtual camera and a left virtual camera;
    cause a display of a head tracking type and non-see-through type virtual reality head mounted display (VR-HMD) to display the stereoscopic image generated based on the virtual stereo camera, the stereoscopic image including a right-eye image captured by the right virtual camera and a left-eye image captured by the left virtual camera;
    determine a front direction of the VR-HMD in the game space relative to a selected object of the plurality of objects;
    recognize a voice input through a microphone;
    determine an object among the plurality of objects to be a selected object based on a result of the recognition;
    determine an information array of one or more information arrays corresponding to the selected object; and
    cause the display of the VR-HMD to place the determined information array in the game space in a relative and three-dimensional manner with respect to the selected object, and the information arrangement direction having a given relative relationship with respect to the determined front direction, wherein:
        a reference direction with respect to the determined information array is linked to the selected object,
        the information array has a hierarchical structure in which the information arrangement direction is defined on a level basis, and
        the causing, by the processor, the display of the VR-HMD to place the determined information array in the game space includes: causing, by the computer, the display of the VR-HMD to place the determined information array in the game space so that the information arrangement direction that corresponds to a first level coincides with the reference direction that is linked to the selected object.

25. An image generation device comprising:
    a processor programmed to:
    set a game space by placing a plurality of objects that form a game world;

place, by the computer, a virtual stereo camera in the game space to generate a stereoscopic image, the virtual stereo camera including a right virtual camera and a left virtual camera;

cause a display of a head tracking type and non-see-through type virtual reality head mounted display (VR-HMD) to display the stereoscopic image generated based on the virtual stereo camera, the stereoscopic image including a right-eye image captured by the right virtual camera and a left-eye image captured by the left virtual camera;

determine a front direction of the VR-HMD in the displayed game space relative to a selected object of the plurality of objects;

determine an object among the plurality of objects that is situated to intersect the front direction to be a selected object;

determine an information array corresponding to the selected object from among one or more information arrays;

cause the display of the VR-HMD to place the determined information array in the displayed game space, wherein the determined information array is an array of items having a hierarchical structure, and has a configuration in which the information arrangement direction is defined on a level basis;

select an item from a plurality of items displayed as the determined information array in a hierarchical order; and cause the display of the VR-HMD to arrange corresponding items in a corresponding information arrangement direction in a hierarchical order based on the selected item.

26. An image generation device comprising:
a processor programmed to:
set a game space by placing a plurality of objects that form a game world;

place, by the computer, a virtual stereo camera in the game space to generate a stereoscopic image, the virtual stereo camera including a right virtual camera and a left virtual camera;

cause a display of a head tracking type and non-see-through type virtual reality head mounted display (VR-HMD) to display the stereoscopic image generated based on the virtual stereo camera, the stereoscopic image including a right-eye image captured by the right virtual camera and a left-eye image captured by the left virtual camera;

determine a front direction of the VR-HMD in the displayed game space relative to a selected object of the plurality of objects;

determine an information array of one or more information arrays based on the front direction of the VR-HMD in the displayed game space;

cause the display of the VR-HMD to place the determined information array in the game space in a relative and three-dimensional manner with respect to the selected object, wherein the determined information array is an array of items having a hierarchical structure, and has a configuration in which the information arrangement direction is defined on a level basis;

select an item from a plurality of items displayed as the determined information array in a hierarchical order; and cause the display of the VR-HMD to arrange corresponding items in a corresponding information arrangement direction in a hierarchical order based on the selected item.

27. An image generation device comprising:
a processor programmed to:
set a game space by placing a plurality of objects that form a game world;

place, by the computer, a virtual stereo camera in the game space to generate a stereoscopic image, the virtual stereo camera including a right virtual camera and a left virtual camera;

cause a display of a head tracking type and non-see-through type virtual reality head mounted display (VR-HMD) to display the stereoscopic image generated based on the virtual stereo camera, the stereoscopic image including a right-eye image captured by the right virtual camera and a left-eye image captured by the left virtual camera;

determine a front direction of the VR-HMD in the game space relative to a selected object of the plurality of objects;

determine a plurality of objects based on the determined front direction;

recognize a voice input through a microphone;

determine an object among the plurality of objects to be a selected object based on a result of the recognition of the voice input;

determine an information array corresponding to the selected object from among one or more information arrays;

cause the display of the VR-HMD to place the determined information array in the game space in a relative and three-dimensional manner with respect to the selected object, and the information arrangement direction having a given relative relationship with respect to the determined front direction, wherein the determined information array is an array of items having a hierarchical structure, and has a configuration in which the information arrangement direction is defined on a level basis;

select an item from a plurality of items displayed as the determined information array in a hierarchical order; and cause the display of the VR-HMD to arrange corresponding items in a corresponding information arrangement direction in a hierarchical order based on the selected item.

28. An image generation device comprising:
a processor programmed to:
set a game space by placing a plurality of objects that form a game world;

place, by the computer, a virtual stereo camera in the game space to generate a stereoscopic image, the virtual stereo camera including a right virtual camera and a left virtual camera;

cause a display of a head tracking type and non-see-through type virtual reality head mounted display (VR-HMD) to display the stereoscopic image generated based on the virtual stereo camera, the stereoscopic image including a right-eye image captured by the right virtual camera and a left-eye image captured by the left virtual camera;

determine a front direction of the VR-HMD in the displayed game space relative to a selected object of the plurality of objects;

determine an object among the plurality of objects that is situated to intersect the front direction to be a selected object;

determine an information array corresponding to the selected object from among one or more information arrays;

cause the display of the VR-HMD to place the determined information array in the displayed game space;

detect a head shake of a user from a motion of the VR-HMD; and cause the display of the VR-HMD to stop displaying the information array when the head shake has been detected.

29. An image generation device comprising:

a processor programmed to:

set a game space by placing a plurality of objects that form a game world;

place, by the computer, a virtual stereo camera in the game space to generate a stereoscopic image, the virtual stereo camera including a right virtual camera and a left virtual camera;

cause a display of a head tracking type and non-see-through type virtual reality head mounted display (VR-HMD) to display the stereoscopic image generated based on the virtual stereo camera, the stereoscopic image including a right-eye image captured by the right virtual camera and a left-eye image captured by the left virtual camera;

determine a front direction of the VR-HMD in the displayed game space relative to a selected object of the plurality of objects;

determine an information array of one or more information arrays based on the front direction of the VR-HMD in the displayed game space;

cause the display of the VR-HMD to place the determined information array in the game space in a relative and three-dimensional manner with respect to the selected object;

detect a head shake of a user from a motion of the VR-HMD; and cause the display of the VR-HMD to stop displaying the information array when the head shake has been detected.

30. An image generation device comprising:

a processor programmed to:

set a game space by placing a plurality of objects that form a game world;

place, by the computer, a virtual stereo camera in the game space to generate a stereoscopic image, the virtual stereo camera including a right virtual camera and a left virtual camera;

cause a display of a head tracking type and non-see-through type virtual reality head mounted display (VR-HMD) to display the stereoscopic image generated based on the virtual stereo camera, the stereoscopic image including a right-eye image captured by the right virtual camera and a left-eye image captured by the left virtual camera;

determine a front direction of the VR-HMD in the game space relative to a selected object of the plurality of objects;

determine a plurality of objects based on the determined front direction;

recognize a voice input through a microphone;

determine an object among the plurality of objects to be a selected object based on a result of the recognition of the voice input;

determine an information array corresponding to the selected object from among one or more information arrays;

cause the display of the VR-HMD to place the determined information array in the game space in a relative and three-dimensional manner with respect to the selected object, and the information arrangement direction having a given relative relationship with respect to the determined front direction;

detect a head shake of a user from a motion of the VR-HMD; and cause the display of the VR-HMD to stop displaying the information array when the head shake has been detected.

31. An image generation device comprising:

a processor programmed to:

set a game space by placing a plurality of objects that form a game world;

place, by the computer, a virtual stereo camera in the game space to generate a stereoscopic image, the virtual stereo camera including a right virtual camera and a left virtual camera;

cause a display of a head tracking type and non-see-through type virtual reality head mounted display (VR-HMD) to display the stereoscopic image generated based on the virtual stereo camera, the stereoscopic image including a right-eye image captured by the right virtual camera and a left-eye image captured by the left virtual camera;

determine a front direction of the VR-HMD in the displayed game space relative to a selected object of the plurality of objects;

determine an information array of one or more information arrays based on the front direction of the VR-HMD in the displayed game space; and cause the display of the VR-HMD to place the determined information array in the game space in a relative and three-dimensional manner with respect to the selected object, wherein the causing the display to place the predetermined information array in the game space so as to satisfy the given placement condition includes causing, by the computer, a size of the information array to be changed so that the information array is situated within a given effective field of view with respect to the front direction when the size of the information array exceeds the given effective field of view.

32. An image generation device comprising:

a processor programmed to:

set a game space by placing a plurality of objects that form a game world;

place, by the computer, a virtual stereo camera in the game space to generate a stereoscopic image, the virtual stereo camera including a right virtual camera and a left virtual camera;

cause a display of a head tracking type and non-see-through type virtual reality head mounted display (VR-HMD) to display the stereoscopic image generated based on the virtual stereo camera, the stereoscopic image including a right-eye image captured by the right virtual camera and a left-eye image captured by the left virtual camera;

determine a front direction of the VR-HMD in the displayed game space relative to a selected object of the plurality of objects;

determine an object among the plurality of objects that is situated to intersect the front direction to be a selected object;

determine an information array corresponding to the selected object from among one or more information arrays; and cause the display of the VR-HMD to place the determined information array in the displayed game space, wherein the one or more information arrays includes two or more information arrays.

33. An image generation device comprising:

a processor programmed to:

set a game space by placing a plurality of objects that form a game world;

place, by the computer, a virtual stereo camera in the game space to generate a stereoscopic image, the virtual stereo camera including a right virtual camera and a left virtual camera;

cause a display of a head tracking type and non-see-through type virtual reality head mounted display (VR-HMD) to display the stereoscopic image generated based on the virtual stereo camera, the stereoscopic image including a right-eye image captured by the right virtual camera and a left-eye image captured by the left virtual camera;

determine a front direction of the VR-HMD in the displayed game space relative to a selected object of the plurality of objects;

determine an information array of one or more information arrays based on the front direction of the VR-HMD in the displayed game space; and cause the display of the VR-HMD to place the determined information array in the game space in a relative and three-dimensional manner with respect to the selected object, wherein the one or more information arrays includes two or more information arrays.

34. An image generation device comprising:

a processor programmed to:

set a game space by placing a plurality of objects that form a game world;

place, by the computer, a virtual stereo camera in the game space to generate a stereoscopic image, the virtual stereo camera including a right virtual camera and a left virtual camera;

cause a display of a head tracking type and non-see-through type virtual reality head mounted display (VR-HMD) to display the stereoscopic image generated based on the virtual stereo camera, the stereoscopic image including a right-eye image captured by the right virtual camera and a left-eye image captured by the left virtual camera;

determine a front direction of the VR-HMD in the game space relative to a selected object of the plurality of objects;

determine a plurality of objects based on the determined front direction;

recognize a voice input through a microphone;

determine an object among the plurality of objects to be a selected object based on a result of the recognition of the voice input;

determine an information array corresponding to the selected object from among one or more information arrays; and cause the display of the VR-HMD to place the determined information array in the game space in a relative and three-dimensional manner with respect to the selected object, and the information arrangement direction having a given relative relationship with respect to the determined front direction, wherein the one or more information arrays includes two or more information arrays.

* * * * *